(12) United States Patent
Park et al.

(10) Patent No.: US 10,431,186 B2
(45) Date of Patent: Oct. 1, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Jang-won Park, Suwon-si (KR); Bong-geun Lee, Hwaseong-si (KR); Jeong-hwan Chang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/789,143

(22) Filed: Oct. 20, 2017

(65) Prior Publication Data

US 2018/0144718 A1    May 24, 2018

(30) Foreign Application Priority Data

Nov. 24, 2016 (KR) .................. 10-2016-0157225

(51) Int. Cl.
*B60R 1/02* (2006.01)
*B60R 1/08* (2006.01)
(Continued)

(52) U.S. Cl.
CPC ......... *G09G 5/10* (2013.01); *G02F 1/133555* (2013.01); *G09G 3/2011* (2013.01); *G09G 3/3406* (2013.01); *G09G 3/3607* (2013.01); *G02F 2001/133557* (2013.01); *G09G 3/2092* (2013.01); *G09G 2320/0238* (2013.01);
(Continued)

(58) Field of Classification Search
CPC .................. B60R 1/12; B60R 1/04
See application file for complete search history.

(56) References Cited

U.S. PATENT DOCUMENTS

| | | | |
|---|---|---|---|
| 2002/0027551 A1* | 3/2002 | Nitta ................ | G09G 3/2011 345/204 |
| 2009/0040306 A1* | 2/2009 | Foote ................ | B60R 1/082 348/148 |

(Continued)

FOREIGN PATENT DOCUMENTS

| | | |
|---|---|---|
| KR | 10-2012-0074499 | 7/2012 |
| WO | 2016/011713 | 1/2016 |
| WO | WO 2018/004615 | 1/2018 |

OTHER PUBLICATIONS

Search Report and Written Opinion dated Feb. 14, 2018 in counterpart International Patent Application No. PCT/KR2017/012395.
(Continued)

*Primary Examiner* — Nan-Ying Yang
(74) *Attorney, Agent, or Firm* — Nixon & Vanderhye P.C.

(57) ABSTRACT

Disclosed is a display apparatus. The display apparatus includes a mirror display, a sensor, a storage which stores transmission and reflection characteristics information of the mirror display, identify and a processor configured to a threshold and to output an image corresponding to the image signal on the mirror display based on the transmission characteristics information, reflection characteristics information, and an amount of external light sensed through the sensor, to adjust a luminance of a image signal based on whether a grayscale of the image signal is less than or equal to the threshold.

18 Claims, 28 Drawing Sheets

(51) Int. Cl.
*G09G 5/10* (2006.01)
*G02F 1/1335* (2006.01)
*G09G 3/36* (2006.01)
*G09G 3/34* (2006.01)
*G09G 3/20* (2006.01)

(52) U.S. Cl.
CPC ............ *G09G 2320/0626* (2013.01); *G09G 2320/0666* (2013.01); *G09G 2320/0673* (2013.01); *G09G 2320/0686* (2013.01); *G09G 2340/06* (2013.01); *G09G 2360/144* (2013.01); *G09G 2360/145* (2013.01)

(56) References Cited

U.S. PATENT DOCUMENTS

| | | |
|---|---|---|
| 2009/0040355 A1 | 2/2009 | Huang |
| 2015/0185562 A1 | 7/2015 | Baek et al. |
| 2016/0154269 A1* | 6/2016 | Fukuoka ........... G02F 1/133536 345/690 |
| 2016/0178964 A1 | 6/2016 | Sakai et al. |
| 2016/0313555 A1 | 10/2016 | Liou et al. |

OTHER PUBLICATIONS

Extended European Search Report dated Apr. 15, 2019 for EP Application No. 17872938.0.

\* cited by examiner

DISPLAY APPARATUS AND CONTROL METHOD THEREOF

CROSS-REFERENCE TO RELATED APPLICATIONS

This application is based on and claims priority under 35 U.S.C. § 119 to Korean Patent Application No. 10-2016-0157225 filed on Nov. 24, 2016 in the Korean Intellectual Property Office, the disclosure of which is incorporated by reference herein in its entirety.

BACKGROUND

1. Field

The present disclosure relates generally to a display apparatus and a control method thereof and, for example, to a display apparatus having a mirror display and a control method thereof.

2. Description of Related Art

Due to the development of electronic technology, various kinds of electronic devices have been developed and are being widely used. Especially, in recent years, various types of electronic devices including TVs have been used in general households. These electronic devices gradually have various functions according to the needs of the users.

For example, various types of services can be provided through a mirror display that provides both a mirror function and a display function. For example, the mirror display can be a mirror by the reflection ratio when the mage is not reproduced on the display, and when the image is reproduced, the image is displayed to the viewer by the transmission ratio.

However, when the external illuminance (e.g., ambient light) is high, there is a problem in that the mirror effect becomes conspicuous, causing obstruction to viewing of an image.

SUMMARY

An example aspect of the present disclosure is to provide a display apparatus which performs image processing to minimize and/or reduce the reflection effect based on reflection characteristics and transmission characteristics of the mirror display and the external light amount and displays the same, and a control method thereof.

The display apparatus according to an example embodiment includes, a mirror display, a sensor, a storage which stores transmission and reflection characteristics information of the mirror display, and a processor configured to identify a threshold, based on the transmission characteristics information, the reflection characteristics information, and an amount of external light sensed through the sensor, to adjust a luminance of a image signal based on whether a grayscale of the image signal is less than or equal to the threshold, and to output the image signal on the mirror display.

The transmission characteristics information of the mirror display may include luminance information based on grayscale of an image which is determined based on transmission ratio of the mirror display, and wherein the reflection characteristics information of the mirror display may include at least one of reflection ratio information of the mirror display and reflection luminance information of the mirror display with respect to the amount of external light.

The processor, based on the transmission characteristics information of the mirror display and reflection luminance of the mirror display with respect to the amount of external light, may identify (determine) a grayscale value of a luminance value which is same as the reflection luminance of the mirror display as the predetermined threshold.

The processor, based on the predetermined threshold, may define (divide) portions of an entire scope of grayscale as a plurality of grayscale sections, and raise the luminance of the image signal by applying different luminance adjustment methods for each grayscale section.

The processor may maintain an input luminance level with respect to a lowest grayscale and a highest grayscale, and raise the luminance of the image signal by applying different luminance adjustment methods for each grayscale sections with respect to remaining grayscale sections.

The processor, based on the predetermined threshold, may divide portions of the entire scope of grayscale into a low grayscale section or a high grayscale section, and if grayscale of the image signal is within the low grayscale section, raise the luminance of the image signal as much as a first luminance level based on reflection luminance of the mirror display, and if grayscale of the image signal is within the high grayscale section, raise the luminance of the image signal as much as a second luminance level.

The processor may divide portions of the entire scope of grayscale into a low grayscale section, a middle grayscale section, and a high grayscale section, if the grayscale of the image signal is within the low grayscale section, raise the luminance of the image signal as much as a first luminance level based on reflection luminance of the mirror display, if the grayscale of the image signal is within the middle grayscale section, maintain luminance of the image signal, and if grayscale of the image signal is within the high grayscale section, raise the luminance of the image signal as much as a second luminance level.

The processor may divided, based on the predetermined threshold, portions of the entire scope of grayscale into a plurality of grayscale sections, calculate (determine) a plurality of luminance adjustment graphs to which characteristics of each of the plurality of grayscale sections are reflected, adjust luminance of the image signal based on at least one of the plurality of calculated luminance adjustment graphs, wherein the plurality of luminance adjustment graphs may be graphs in which input luminance level is maintained with respect to lowest grayscale and highest grayscale from among entire scope of grayscale, and luminance levels of remaining grayscale may be raised differently based on characteristics of a corresponding scope of grayscale.

The processor may determine a luminance adjustment graph corresponding to main grayscale information of frame of the image signal from among the plurality of luminance adjustment graphs and adjust luminance level of the corresponding frame based on the identified luminance adjustment graph.

The processor may determine color shift degree by pixel areas based on the luminance level adjustment and adjust color coordinate of the pixel area to compensate the color shift.

The mirror display may include a display panel and a half mirror which is disposed on an upper part of the display panel and has a predetermined reflection ratio and a predetermined transmission ratio.

According to an example embodiment, a method of controlling a display apparatus including a mirror display includes sensing an amount of external light; and identify a threshold, based on the transmission characteristics information of the mirror display, the reflection characteristics information of the mirror display, and the sensed amount of external light, adjust a luminance of a image signal based on whether a grayscale of the image signal is less than or equal to the threshold and outputting an image corresponding to the image signal on the mirror display.

The transmission characteristic information of the mirror display may include luminance information based on grayscale of an image which is determined based on transmission ratio of the mirror display, and the reflection characteristics information of the mirror display may include at least one of reflection ratio of the mirror display and luminance information of the mirror display with respect to an amount of external light.

The outputting may include, based on the transmission characteristics information of the mirror display and reflection luminance of the mirror display with respect to the amount of external light, identifying a grayscale value which has a same luminance value as the reflection luminance of the mirror display as the predetermined threshold.

The outputting may include, based on the predetermined threshold, dividing sections of an entire scope of grayscale into a plurality of grayscale sections, and raising the luminance of the image signal by applying different luminance adjustment methods for each grayscale section.

The outputting may include maintaining an input luminance level with respect to a lowest grayscale and a highest grayscale, and raising the luminance of the image signal by applying different luminance adjustment methods for each grayscale sections with respect to remaining grayscale sections.

The outputting may include, based on the predetermined threshold, dividing portions of the entire scope of grayscale into a low grayscale section and a high grayscale section, and if grayscale of the image signal is within the low grayscale section, raising the luminance of the image signal as much as a first luminance level based on reflection luminance of the mirror display, and if grayscale of the image signal is within the high grayscale section, raising the luminance of the image signal as much as a second luminance level.

The outputting may include, based on the predetermined threshold, dividing portions of the entire scope of grayscale into a low grayscale section, a middle grayscale section, and a high grayscale section, if the grayscale of the image signal is within the low grayscale section, raising the luminance of the image signal as much as a first luminance level based on reflection luminance of the mirror display, if the grayscale of the image signal is within the middle grayscale section, maintaining luminance of the image signal, and in if grayscale of the image signal is within the high grayscale section, raising the luminance of the image signal as much as a second luminance level.

The outputting may include, based on the predetermined threshold, dividing sections of the entire scope of grayscale into a plurality of grayscale sections and calculating (determining) a plurality of luminance adjustment graphs to which characteristics of each of the plurality of grayscale sections are reflected; and adjusting luminance of the image signal based on at least one of the plurality of calculated luminance adjustment graphs, wherein the plurality of luminance adjustment graphs are graphs in which input luminance level is maintained with respect to lowest grayscale and highest grayscale from among entire scope of grayscale, and luminance levels of remaining grayscale are raised differently based on characteristics of a corresponding scope of grayscale.

According to an example embodiment, a non-transitory computer readable medium which stores a computer command, when executed by a processor of an electronic apparatus is provided, enabling the electronic apparatus to perform an operation including identifying a threshold based on transmission characteristics information of the mirror display, transmission characteristics information of the mirror display, and an amount of external light, and outputting on the mirror display and adjusting a luminance of a image signal based on whether a grayscale of the image signal is less than or equal to the threshold.

According to various example embodiments, the reflection effect of the mirror display may be reduced through suitable image processing based on an illuminance environment and thus, user convenience would be improved.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Hereinafter, various example embodiments will be described in greater detail with reference to the accompanying drawings.

Figure 1A:
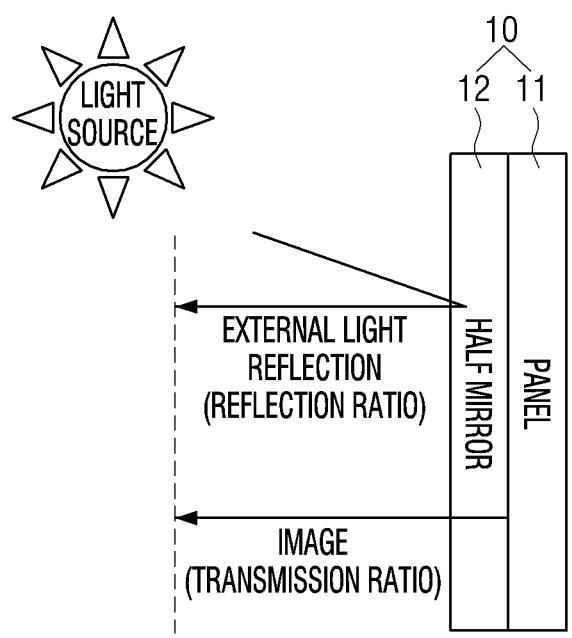
FIGS. 1A, 1B and 1C are diagrams illustrating example characteristics of a mirror display according to an example embodiment.
Figure 1B:
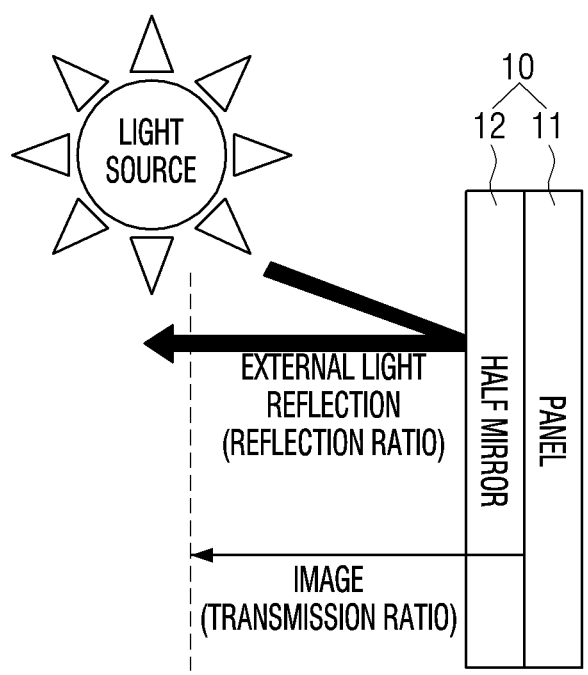
Figure 1C:
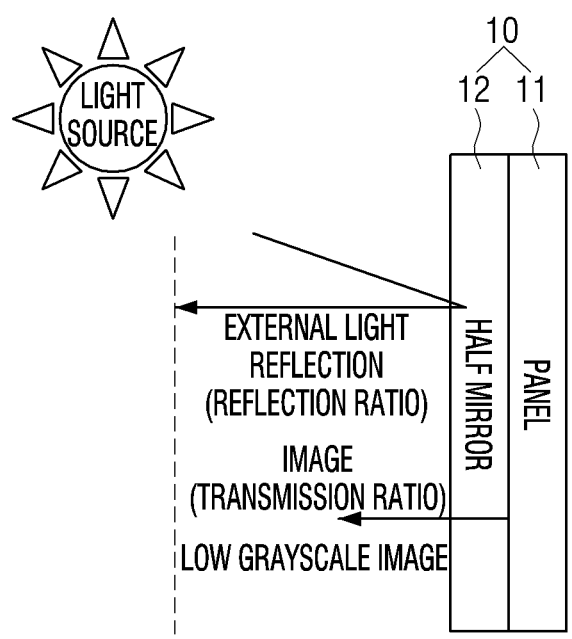

FIGS. 1A, 1B and 1C are diagrams illustrating example characteristics of a mirror display according to an example embodiment.

The display apparatus according to an example embodiment of the present disclosure may be implemented as various types of mirror display apparatus installed in various places where a mirror is required to transmit information while providing a mirror function. Here, 'Mirror Display' is a compound term of 'Mirror' referring, for example, to a mirror and 'Display' referring, for example, to an operation to visually express information.

As illustrated in FIG. 1A, the mirror display 10 may be implemented as a half mirror (or mirror film) 12 added on a general display panel 11.

The display panel 11 may be implemented as a display panel such as liquid crystal display (LCD) panel, organic light emitting diodes (OLED), liquid crystal on silicon (LCoS), digital light processing (DLP), or the like, but is not limited thereto.

The half mirror 12 may, for example, and without limitation, be formed of a glass plate or a transparent plastic plate on which a metal thin film or a dielectric multilayer film reflecting a part of incident light and penetrating another part is deposited.

FIG. 1A is a view for explaining a usage form of a general mirror display 10 in which a viewer views an image reproduced in a display panel 11 of a mirror display 10 through a half mirror 12, and when the image is not reproduced at the same time, a user may see the light from the external light source being reflected by the half mirror 12 and thus, a user may use the mirror display as a mirror.

However, as illustrated in FIG. 1B, when the intensity of the light reflected by the half mirror 12 is high due to the high external light intensity, the visibility of the reproduced image may be deteriorated due to the reflected light. In addition, as illustrated in FIG. 1C, when a low-grayscale image is displayed in the display panel 11, the mirror effect becomes conspicuous and the visibility of the reproduced image becomes poor.

Accordingly, in the present disclosure, it is possible to minimize and/or reduce the reflection effect by adjusting the luminance level of the image based on the reflection threshold that generates a reflection effect on the mirror display 10. Hereinafter, various example embodiments of the present disclosure will be described with reference to the drawings.

Figure 2:
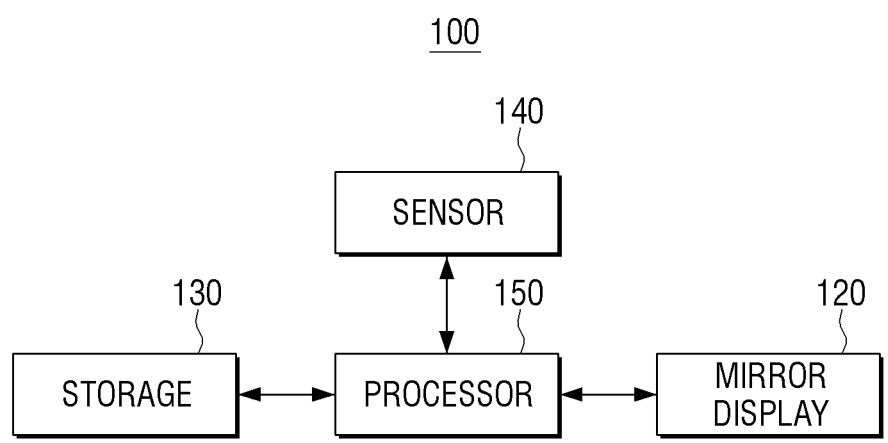
FIG. 2 is a block diagram illustrating an example configuration of a display apparatus according to an example embodiment.

FIG. 2 is a block diagram illustrating an example configuration of a display apparatus according to an example embodiment.

According to FIG. 2, the display apparatus 100 includes a mirror display 120, a storage 130, a sensor 140, and a processor (e.g., including processing circuitry) 150.

Here, the display apparatus 100 may be implemented as a smart phone, a tablet, a smart TV, an Internet TV, a Web TV, an Internet Protocol Television (IPTV), a network, signage, a PC, a smart TV, a monitor or the like, but is not limited thereto, and can be implemented as various types of devices with display functions such as large format display (LFD), digital signage, digital information display (DID), a video wall, a projector display, or the like.

The mirror display 120 may be implemented as a display which provides a mirror function and a display function.

The mirror display 120 may be implemented as a liquid crystal display panel (LCD), an organic light emitting diode (OLED), a liquid crystal on silicon (LCoS), a digital light processing (DLP), or the like, but is not limited thereto. Also, the display 120 may be implemented as a transparent display that is implemented with a transparent material and displays information. The mirror display 120 may be implemented as a touch screen having a mutual layer structure with a touch pad. In this case, the mirror display 120 may be used as a user interface in addition to the output device.

Figure 3A:
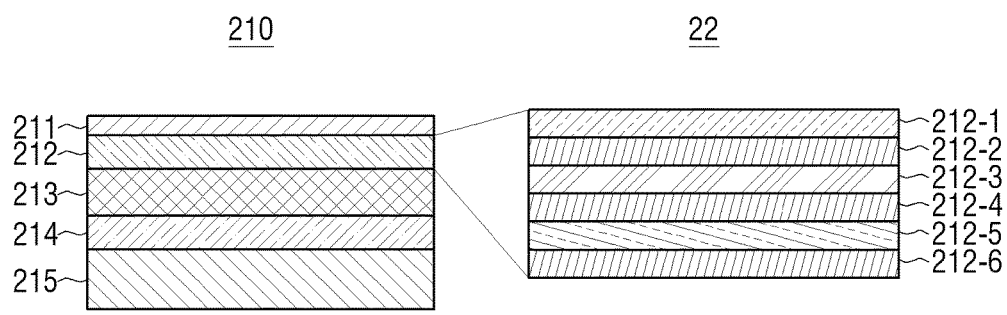
FIGS. 3A and 3B are diagrams illustrating an example structure of a mirror display according to an example embodiment.
Figure 3B:
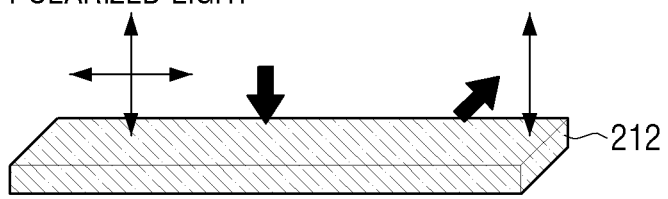
Figure 3B:
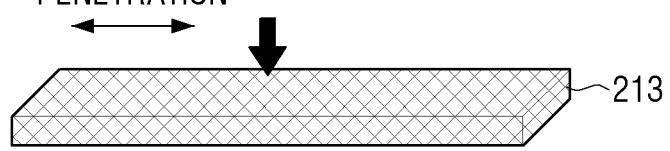
Figure 3B:
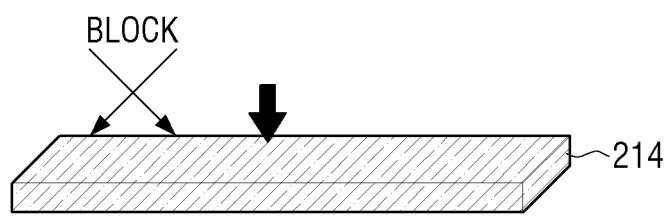

Meanwhile, the mirror display 120 may be implemented by adding a half mirror (or a mirror film) to a conventional display panel. The display 210 illustrated in FIG. 3A and FIG. 3B are diagrams illustrating an example LCD among various display types. The LCD which is also called a liquid crystal display operates in a mechanism that light is generated from a backlight, the light passes through particles of the liquid display, and a desired image is obtained.

The LCD 210 includes a coating film 211, an upper polarizer 212, a liquid crystal display panel 213, a lower polarizer 214, and a backlight 215. The upper and lower polarizers 212 and 214 classify light when the light emitted from the backlight 215 is transmitted through the liquid crystal and emits light. The liquid crystal display panel 213 located between the upper and lower polarizers 212 and 214 includes a light emitting material.

According to an example embodiment, a mirror film 212-3, which provides the function of a mirror, may be located on the upper polarizer 212 to classify the light. The upper polarizer 212 may include protective films 212-2, 212-4, and 212-6, a light classification film 212-5, and the mirror film 212-3 as illustrated. Here, the protective films 212-2, 212-4, and 212-6 are films that serve to protect the polarizing plate, and can be implemented as, for example, and without limitation, TAG (Tri-Acetyl-Cellulose). The light classification film 212-5 is a film that functions to sort light in a polarizing plate and can be implemented with PVA Polyvinyl Alcohol (PVA). The reason why the mirror film 212-3 is placed in the polarizing plate for filtering light is due to the basic property of the mirror. Since the mirror reflects light basically, the polarizing plate is used to reflect a specific light and to transmit a specific light, so that it can act as a display and a mirror at the same time. In the meantime, when the mirror function is provided only in a part of the screen, only the backlight 215 of some areas can be driven in the OFF state based on the local dimming.

However, the mirror display structure illustrated in FIGS. 3A and 3B is an example of the mirror display structure, and is not limited to the structure as long as it can provide the functions of the mirror and the display. For example, in the case of a self-luminous display panel which does not require a backlight, it can be realized as a polarizing plate having a mirror film and a liquid crystal display panel.

Referring back to FIG. 2, the storage 130 stores the transmission characteristics information and reflection characteristics information of the mirror display 120.

Here, the transmission characteristics information of the mirror display 120 may include information on the luminance value according to grayscale of an image signal which is determined based on transmission rate of the mirror display 120. For example, the luminance characteristics information of the mirror display 120 may be a luminance measurement value according to the grayscale of the image signal. That is, since the mirror display 120 has a fixed transmission rate, the luminance value according to the grayscale of the image signal can be obtained by inputting the image signal by grayscale. That is, an luminance measurement value according to the grayscale of the input image signal is calculated by inputting 0 IRE (Institute of Radio Engineers) (black) to 100 IRE (white) image signal (for example, 0 to 255 grayscale image in case of 8-bit image) and can be stored in the storage 130. The luminance measurement value according to the grayscale of the image signal is also referred to as a gamma table (or a gamma curve), and can be directly measured by an experiment, but it can also be predicted and calculated based on the transmittance of the mirror display 120.

The reflection characteristics information of the mirror display 120 may include at least one of reflection ratio information of the mirror display 120 and reflection luminance of the mirror display 120 with respect to external light. In one example, the reflection characteristics information may be the reflection ratio of the mirror display 120 itself. In this case, the reflection luminance according to the external light amount according to an embodiment of the present disclosure can be calculated (determined) based on the external light amount and reflection ratio measured by the sensor 140 described later. As another example, the reflection characteristics information may be the measured or pre-calculated type information of the reflection luminance of the mirror display 120 according to the external light amount. Here, the reflection luminance of the mirror display 120 may be a luminance value generated as external light is reflected based on the reflection ratio of the mirror display 120.

However, the luminance characteristics information and reflection characteristics information of the mirror display 120 may be received from an external server (not shown) or the like. For example, when the luminance characteristics information corresponding to the identification information (for example, the manufacturing number, model) of the mirror display 120 is stored in the external server, the display apparatus 100 may receive the information from the external server.

Figure 4:
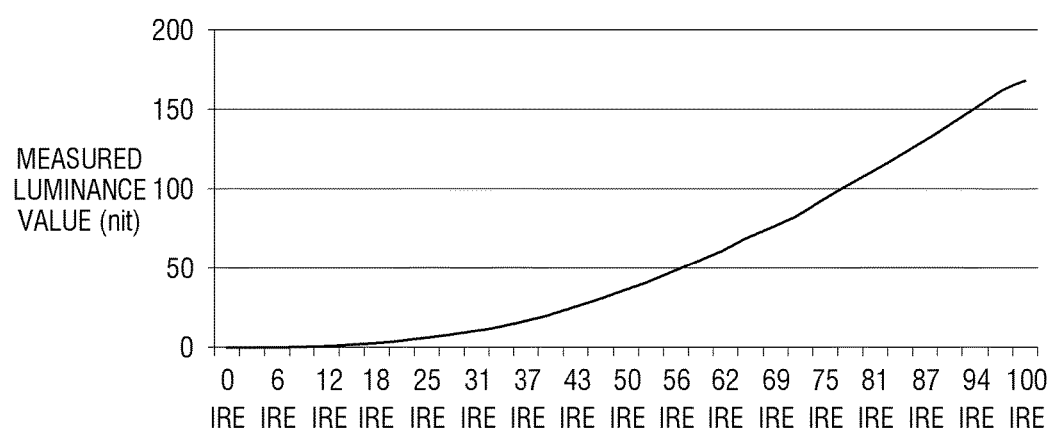
FIG. 4 is a graph illustrating example luminance value by grayscales according to an example embodiment.

FIG. 4 is a graph illustrating information on transmission features according to an example embodiment.

As illustrated in FIG. 4, luminance value can be measured by inputting 0 IRE (black) to 100 IRE (white) image signals to the mirror display 120 having a fixed transmission rate. The luminance measurement value for each grayscale level according thereto, that is, the transmission characteristic information, may be stored in the storage 130. In addition, as described above, the luminance measurement value for each grayscale level may be a value predicted by the processor 150, rather than a measured value, or may be received from the outside.

However, the storage 130 may store only the basic luminance graph, and the processor 150 may calculate (determine) the luminance graph corresponding to the transmission rate of the mirror display 120 in real time based on the LUT, the calculation formula, etc.

The storage 130 may store various data, programs, or applications for driving/controlling the display apparatus 100. In addition, the storage 130 may include a user sensing module, a communication control module, a voice recognition module, a motion recognition module, a light receiving module, a display control module, an audio control module, an external input control module, a power control module, sound database (DB) or motion database (DB).

The storage 130 may be implemented as an internal memory such as a ROM or a RAM included in the processor 150 or may be implemented as a memory separate from the processor 150. In this case, the storage 130 may be implemented as a memory embedded in the display apparatus 100 or a memory removably attached to the display apparatus 100 depending on a data storage purpose of the storage 130.

The sensor 140 may include various sensing circuitry that senses external light.

For example, the sensor 140 may sense at least one of various characteristics such as illuminance of light, intensity, color, incidence direction, incidence area, distribution, and the like. According to an embodiment, the sensor 140 may be an illuminance sensor, a temperature sensor, a light intensity sensing layer, a camera.

In particular, the sensor 140 may be implemented as an illuminance sensor that senses RGB light, but the present disclosure is not limited thereto. For example, a sensor capable of sensing light, such as a white sensor, an IR sensor, an IR+RED sensor, HRM sensor, and camera is applicable.

In this case, various kinds of photovoltaic cells can be used as the illuminance sensor, but it is also possible to use a photovoltaic tube for measurement of very low illuminance. For example, the CDS illuminance sensor may be provided in the display apparatus 100 to sense illumination in both directions. In this case, the illuminance sensor may be installed in at least one predetermined area on both sides of the display apparatus 100, but it may be provided in each pixel unit on both sides. For example, it is also possible to provide an illuminance sensor of an enlarged form so that the CMOS sensor corresponds to the size of the display 120, and to measure the illuminance state of each area or each pixel. For example, the CDS illuminance sensor senses the light around the display apparatus 100, and the A/D converter converts the voltage acquired through the CDS illuminance sensor to a digital value and transmits the digital value to the processor 150.

Meanwhile, at least one sensor 140 may be provided, and if a plurality of sensors 140 are provided, other positions may be used as long as they can measure illuminance in different directions. For example, the second sensor may be provided at a position where it is possible to sense the illuminance in the other direction of the angle that is different by 90 degrees or more from the first sensor.

For example, the sensor 140 may be disposed inside the glass provided in the mirror display 120. In this case, through the algorithm which compensates transmission rate/reflection rate of glass provided in the mirror display 120, it can be controlled so that the sensing function can be normally operating even inside the glass.

In addition, various sensors such as a touch sensor, an acceleration sensor, a geomagnetic sensor, and user sensing which are required for operations of the display apparatus 100 can be further provided.

The processor 150 may include various processing circuitry and controls the overall operations of the display apparatus 100. The processor 150 may include various processing circuitry, such as, for example, and without limitation, one or more of a dedicated processor, a central processing unit (CPU), a controller, an application processor (AP), a communication processor (CP), an ARM processor, or may be defined by the term. In addition, the processor 150 may be implemented as a digital signal processor (DSP), a SoC having an image processing algorithm embedded therein, or a field programmable gate array (FPGA).

The processor 150 adjusts the luminance of the image signal according to whether the luminance of the image signal is equal to or less than a predetermined threshold value, based on the transmission characteristics information, the reflection characteristics information, and the sensed amount of external light, of the mirror display 120, and outputs it to the mirror display 120. Here, the predetermined threshold may be a reflection threshold at which the reflection effect of the mirror display 120 disappears.

For example, the processor 150 may determine the reflection threshold at which the reflection effect disappears based on the reflection luminance of the mirror display 120 with respect to external light and transmission characteristics information (for example, the aforementioned luminance graph and luminance table) of the mirror display 120. The processor 150 may then adjust the luminance of the image signal based on the reflection threshold of the mirror display 120 and output it to the mirror display 120. Here, the reflection threshold varies depending on the reflection ratio (or reflection luminance) of the mirror display 120, the luminance of the input image signal, and the intensity of external light.

The reflection luminance of the mirror display 120 with respect to the external light changes according to the amount of external light. According to an example embodiment, when the reflection luminance of the mirror display 120 by external light amounts is stored in the storage 130, the processor 150 may obtain the reflection luminance of the mirror display 120 corresponding to the present external light amount which is sensed by the sensor 140 from the storage 130.

According to another example embodiment, when the reflection ratio of the mirror display 120 is stored in the storage 130, the processor 150 may directly calculate the reflection luminance of the mirror display 120 based on reflection ratio of the mirror display 120 obtained from the storage 130 and intensity of the sensed amount of external light. For example, the processor 150 can directly calculate the reflection luminance of the mirror display 120 corresponding to the amount of current external light by multiplying the sensed amount of external light by the reflection ratio of the mirror display 120.

Alternatively, when the information is stored in the external server, the information can be obtained from the external server. For example, when the mirror display 120 is manufactured such that the same model has the same reflection ratio, reflection luminance according to external light by models can be stored in an external server.

However, the luminance of the image currently displayed on the screen may affect the reflection luminance of the actual mirror display 120. For example, when a high-grayscale image is displayed, the luminance of the high-grayscale image can affect the reflection luminance of the mirror display 120. In this case, the reflection luminance of the mirror display 120 may be re-calculated in consideration of the luminance of the currently displayed image. It is also possible that the reflection luminance considering the effect is prestored.

Based on the reflection luminance information of the mirror display 120 and the transmission characteristics information of the mirror display 120 with respect to the amount of external light, the processor 150 may determine grayscale of an image signal having the same luminance value as the reflection luminance of the mirror display as reflection threshold that the reflection effect of the mirror display 120 disappears.

Figure 5:
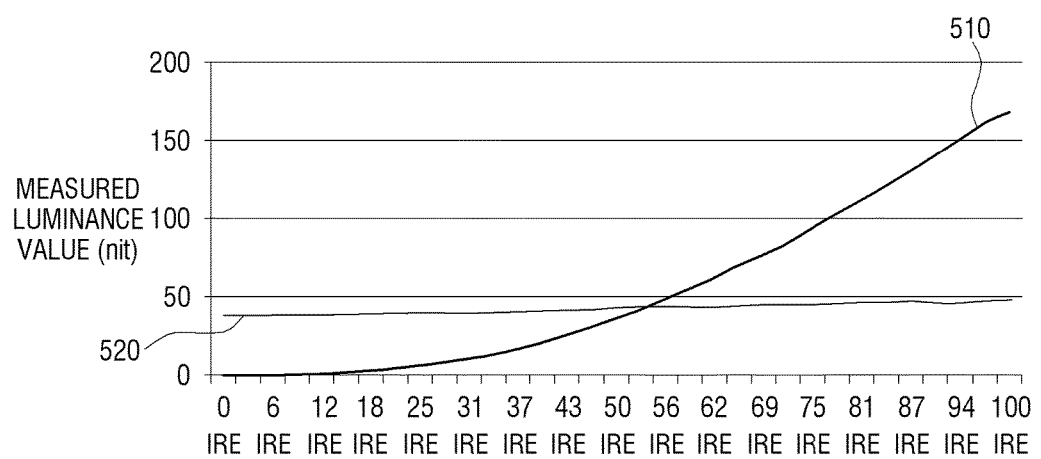
FIGS. 5, 6A, and 6B are graphs illustrating an example method for determining a reflection threshold point according to an example embodiment.
Figure 6A:
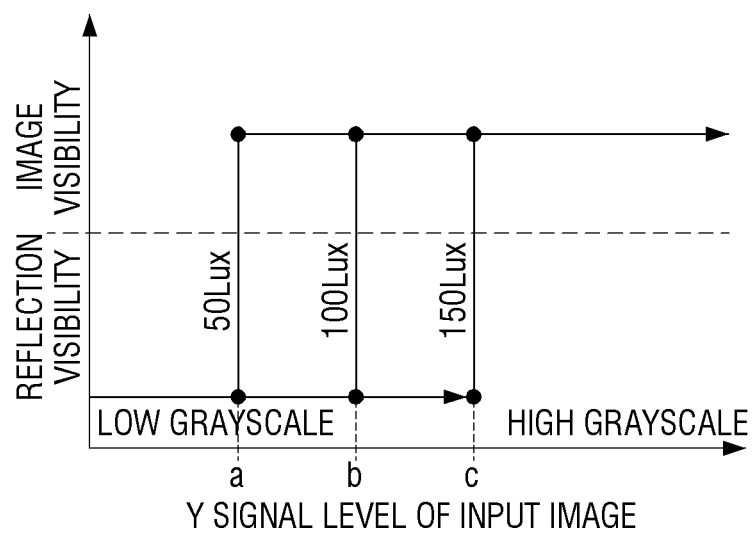
Figure 6B:
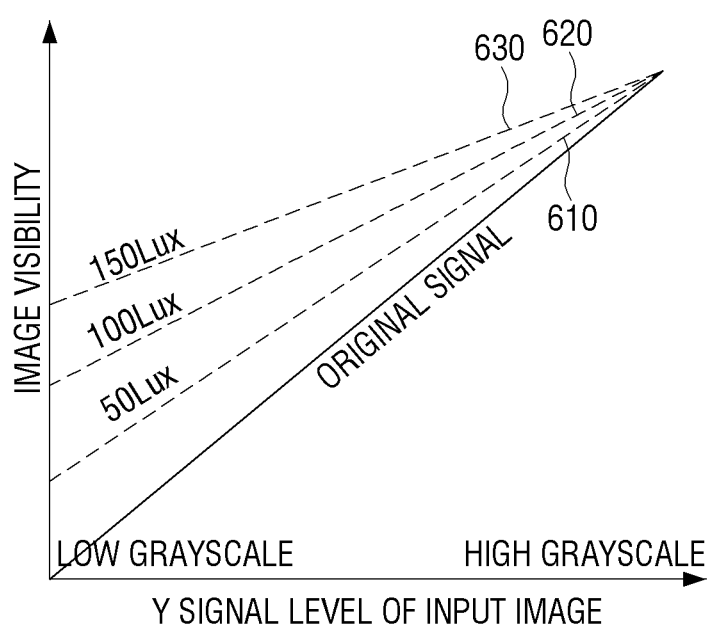

FIGS. 5, 6A, and 6B are graphs illustrating an example method for determining a reflection threshold point according to an example embodiment.

In FIG. 5, a first graph 510 is a luminance graph showing transmission characteristics of the mirror display 120, and a second graph 520 is a graph showing reflection luminance of the mirror display 120 with respect to external light. Here, the first graph 510 does not change because the transmittance rate of the mirror display 120 is fixed (after the manufacture), but the second graph 520 may be reflection luminance of the mirror display 120 with respect to a predetermined amount of external light (external light of predetermined intensity) and a shape of the second graph can be different according to intensity of external light.

In this case, the grayscale value at the point where the first graph 510 and the second graph 520 meet may be the reflection threshold. In other words, the left area with respect to the reflection threshold is an area having a higher luminance due to the external light reflection than the luminance of the transmitted image and there is much reflection effect, and the right area has a luminance lower due to the external light reflection than the luminance of the transmitted image and there is little reflection effect.

The reflection threshold, in consideration that the transmission rate of the mirror display 120 is fixed (after manufacture), changes according to the second graph 520 which changes by the intensity of external light.

When the transmission rate and the reflection rate of the mirror display 120 are stored in the display apparatus 100 (for example, the storage 130), the processor 150 may calculate the first graph 510 based on the transmission rate of the mirror display 120 and the second graph 520 based on the reflection rate of the mirror display 120.

Alternatively, information corresponding to at least one of the first graph 510 and the second graph may be prestored in the display apparatus 100. For example, data may be stored in the form of a lookup table in at least one of the first graph 510 and the second graph.

The reflection threshold according to external light of the mirror display 120 may be calculated through an experiment during manufacturing the display 120 and stored in the display apparatus 100.

FIG. 6A is a graph illustrating an example reflection threshold according to amount of external light.

As illustrated in FIG. 6A, the reflection threshold may have the values such as a, b, and c in the external light of different intensities, for example, 50 lux, 100 lux, and 150 lux. When the transmission ratio and the reflection ratio of the mirror display 120 are stored, the reflection threshold can be calculated according to the amount of external light that is currently sensed.

In this case, as illustrated in FIG. 6B, when the luminance level of the input image signal is adjusted upwards (610, 620, and 630) (hereinafter, referred to as an auxiliary line) by a luminance level indicating a reflection effect according to the intensity of external light, the reflection effect can be offset. For example, luminance level can be adjusted upward such that, in a black signal, luminance level is raised as much as a luminance level (a, b, c) corresponding to the reflection threshold, and in a white signal, luminance level is raised to be the same as the luminance level of the input image signal.

However, when the luminance level of the black signal is raised, there may be distortion of signal such as a black color of the input image is seen as gray color, or the like.

Thus, according to another example embodiment of the present disclosure, the processor 150 may adjust a luminance level of the input image signal so that, in the lowest grayscale level, the luminance level is maintained, and in the remaining grayscale level, the luminance level is raised based on the reflection luminance of the mirror display 120.

The processor 150, based on the reflection threshold, may divide sections of the entire scope of grayscale into a plurality of grayscale sections and raise the luminance of the input image signal by applying different luminance adjustment methods by grayscale sections.

In this case, the processor 150 can raise the luminance of the input image signal based on the grayscale characteristics of the image signal. Here, the term grayscale means that the change in the color saturation, i.e., the bright portion and the dark portion, is subdivided into several levels. In general, the more the luminance difference is divided, the more the color change is expressed naturally. In this case, it is expressed that grayscale is good.

In this case, the processor 150 maintains the input luminance level for at least one of the lowest grayscale and the highest grayscale, and raise the luminance of the input image signal by applying different luminance adjustment methods by grayscale sections for remaining grayscale section. For example, for the luminance level of the lowest grayscale (e.g., black) and the highest grayscale (e.g., white), the original luminance level may be maintained, and for the remaining grayscale, luminance may be corrected based on the characteristics of the divided grayscale sections.

For example, if the grayscale of the input image signal is within the low grayscale section, the processor 150 may raise the luminance of the input image signal as much as the reflectance luminance of the mirror display 120, or raise the reflection luminance of the mirror display 120 as much as the luminance within the predetermined threshold range.

In this case, the processor 150 may determine whether it belongs to a high grayscale section or a low grayscale section in a predetermined pixel area unit (for example, each pixel unit) of the input image, and adjust the luminance level of the pixel area.

For example, when the grayscale values of each pixel of the input image have grayscale values less than the reflection threshold, the processor 150 may adjust the luminance level of the pixels so as to match the characteristics of the low grayscale section, and when the grayscale value of each pixel has a grayscale value equal to or higher than the reflection threshold, the processor 150 may adjust the luminance level so as to match the characteristics of the high grayscale section for the pixel.

As another example, when the grayscale values of the pixels of the input image have grayscale values within a predetermined range including the reflection threshold, the processor 150 adjusts the luminance levels of the pixels corresponding to the characteristics of the middle grayscale range. When the grayscale values have grayscale value which is greater than or equal to a predetermined range including the reflection threshold, the processor adjusts the luminance level to match the characteristics of the high grayscale section for the corresponding pixel. When the grayscale value has a value which is less than the lower limit of the predetermined range including the reflection threshold, the processor may adjust the grayscale value to match the characteristics of the lower grayscale section for the pixel.

Figure 7:
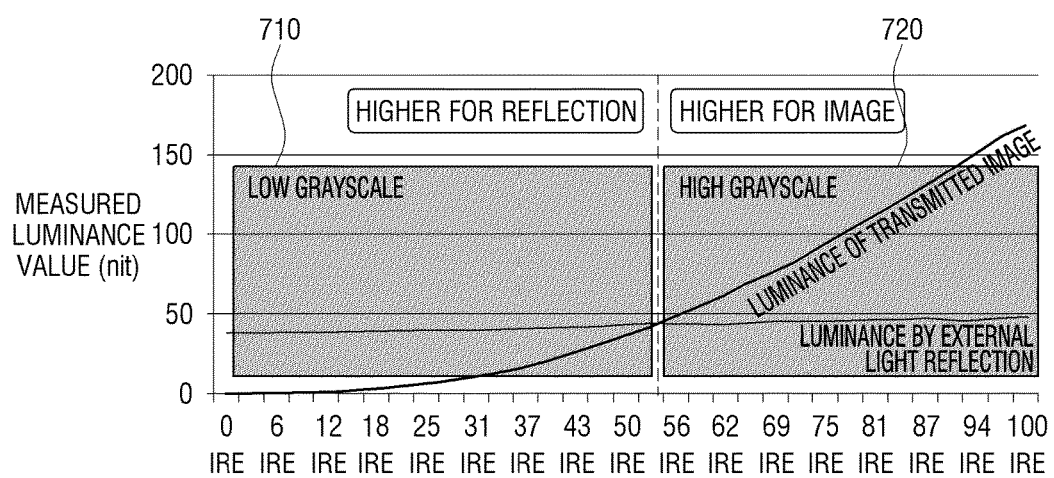
FIG. 7 is a diagram illustrating an example method for dividing grayscale sections of an image according to an example embodiment.

FIG. 7 is a view to illustrating an example method for dividing grayscale sections of an image according to an example embodiment.

Referring to FIG. 7, according to an embodiment of the present disclosure, the entire grayscale range can be defined as two grayscale ranges based on the reflection threshold. For example, the grayscale range below (less than or equal to) the reflection threshold can be defined as the low grayscale section 710 and the grayscale range equal to or above the reflection threshold can be defined as the high grayscale section 720 based on the reflection threshold.

Figure 8:
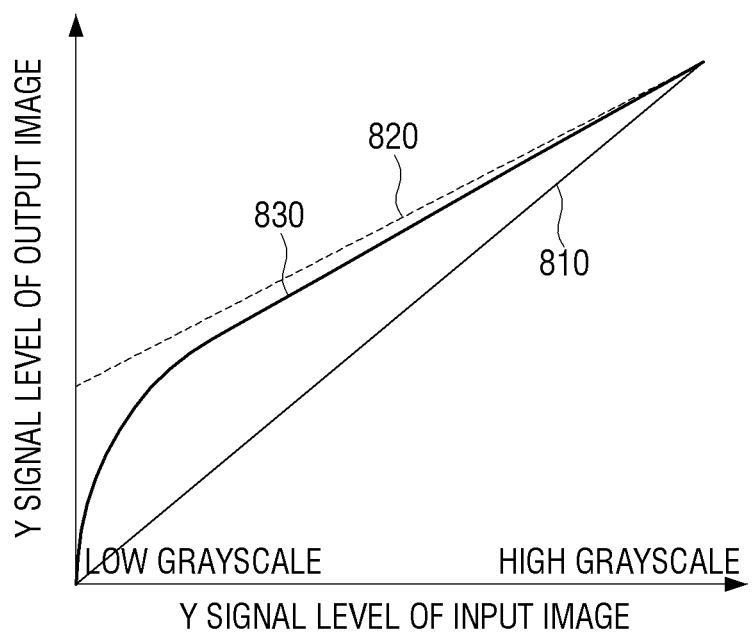
FIG. 8 is a graph illustrating an example method for adjusting luminance according to an example embodiment.

In this case, the processor 150 may maintain the original luminance level for the luminance level of the lowest grayscale (for example, black) as illustrated in the graph of FIG. 8 and adjust luminance of input image so that luminance level of remaining grayscale can be raised.

For example, with respect to the input image signal 810, the black image signal can maintain original luminance level, and as for image signal of remaining grayscale, luminance can be raised based on the shape of graph 830 which approaches an auxiliary line 820 calculated based on the reflection threshold. Here, the luminance level corresponding to initial value of the auxiliary line 820 can be luminance level which is calculated based on reflection threshold according to intensity of external light as illustrated in FIGS. 6A and 6B.

Figure 9A:
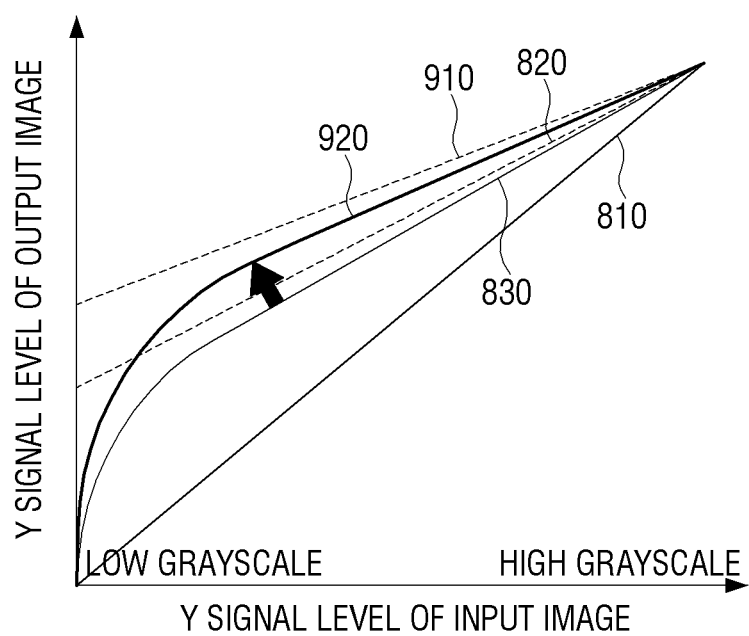
FIGS. 9A and 9B are diagrams illustrating an example luminance adjustment graph which changes based on intensity of external light according to an example embodiment.
Figure 9B:
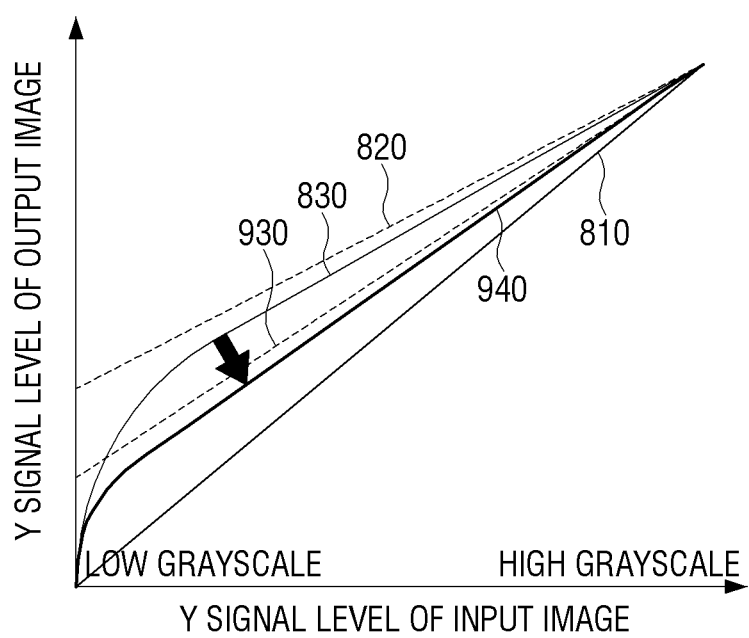

FIGS. 9A and 9B are diagrams illustrating example luminance adjustment graphs which change based on intensity of external light according to an example embodiment.

FIG. 9A illustrates a luminance adjustment graph which is applied to comparatively high luminance.

At comparatively higher luminance, the reflection threshold is raised and thus, as illustrated in FIG. 9A, the initial value of the auxiliary line 910, that is, the luminance level corresponding to the reflection threshold is formed at a high position. Accordingly, the luminance adjustment graph 920 can be a graph in which the degree of upward adjustment is relatively rapid.

FIG. 9B illustrates an illuminance adjustment graph which is applied to comparatively low luminance.

At a comparatively low illuminance, reflection threshold becomes lower and causes weak reflection effect and thus, as illustrated in FIG. 9B, the luminance level which corresponds to the initial value of the auxiliary line 930, that is, luminance level corresponding to the reflection threshold is formed at a lower position. Accordingly, the luminance adjustment graph 940 can be a graph in which the upward adjustment information is relatively gentle. Alternatively, the original luminance level may be maintained without adjusting the luminance.

Figure 10A:
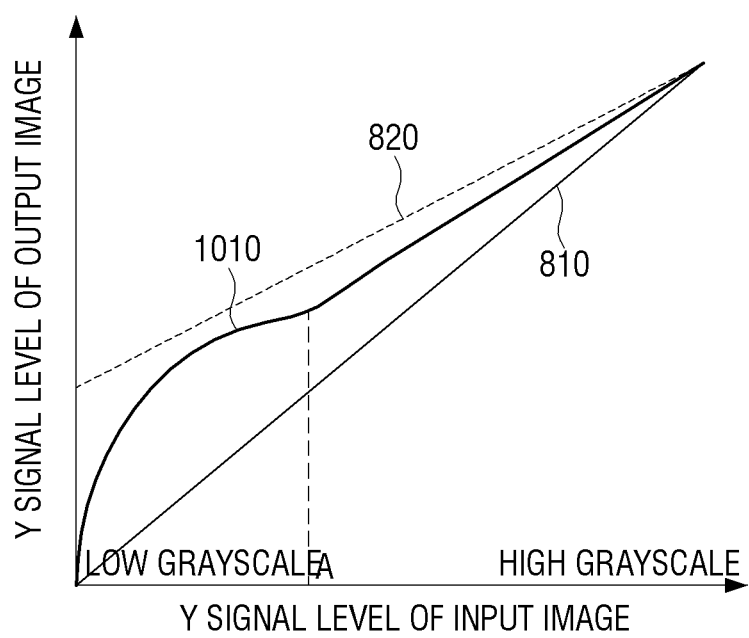
FIGS. 10A and 10B are graphs illustrating an example of changing of a luminance adjustment graph illustrated in FIG. 8.
Figure 10B:
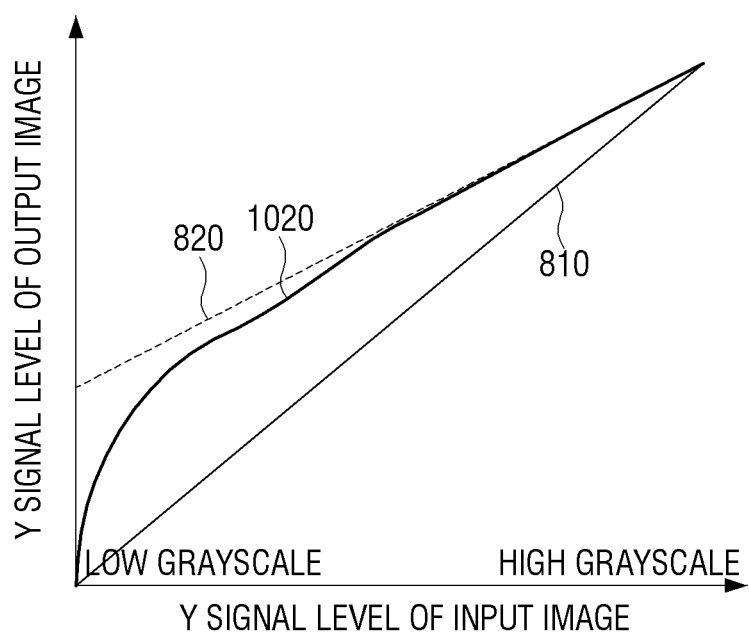

FIGS. 10A and 10B are graphs illustrating an example of changing of a luminance adjustment graph illustrated in FIG. 8.

According to the graph illustrated in FIG. 10A, for the input image signal 810, the low grayscale section sharply increases the luminance to approach the auxiliary line 820, and at the certain point A, the luminance can be adjusted based on the luminance adjustment graph 1010 which increases the luminance constantly to reach the highest grayscale of the luminance. According to this, the contrast of the low-grayscale signal is increased without distorting the black signal, and the visibility of the image can be further increased.

FIG. 10B illustrates a luminance adjustment technique according to another example embodiment. According to the graph shown in FIG. 10B, the contrast of low grayscale is increased at the black point around the auxiliary line 820, and the luminance can be adjusted based on the luminance adjustment graph 1020 in which the contrast of the middle grayscale or the high grayscale is changed according to an illuminance environment or an image state.

However, if a predetermined type of luminance adjustment graph (for example, FIGS. 8, 9A, 9B, 10A, and 10B) is reflected in all images (or image frames) as in the aforementioned example embodiment, in the low grayscale image, the effect that reflection phenomenon is reduced can be obtained. However, in the high grayscale image where reflection phenomenon does not occur even when luminance adjustment is not performed, rather side effect may occur.

Accordingly, in another embodiment of the present disclosure, luminance adjustment can be performed differently based on the main grayscale information of the image signal to minimize and/or reduce the side effect. For example, the processor 150 may determine a grayscale section belonging to an image frame unit and adjust the luminance by applying a different luminance adjustment graph.

For example, according to another embodiment of the present disclosure, the processor 150 may divide sections of the entire grayscale range into a low grayscale section, a middle grayscale section, and a high grayscale section with reference to a reflection threshold, and when the grayscale of the image signal is within the low grayscale section, the luminance level of the image signal is raised as much as the first luminance level based on the reflection luminance of the mirror display 120. When the grayscale of the image signal is within the high grayscale section, the luminance level of the image signal may be raised as much as the second luminance level, and when the grayscale is within the middle grayscale section, luminance level of the image signal can be maintained. Here, the first luminance level may be a value greater than the second luminance level.

FIGS. 11, 12A, 12B, 12C, 13A, and 13B are diagrams illustrating an example method for dividing a grayscale section according to another example embodiment.

Figure 11:
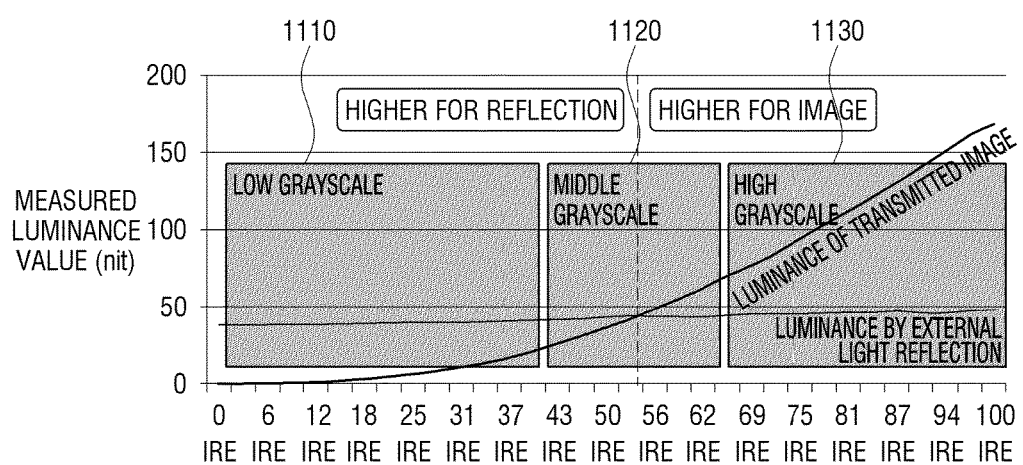
FIGS. 11, 12A, 12B, 12C, 13A, and 13B are diagrams illustrating an example method for dividing a grayscale section according to another example embodiment.

Referring to FIG. 11, according to another embodiment of the present disclosure, the entire grayscale range can be defined as three grayscale sections based on the reflection threshold. For example, a grayscale section within a predetermined range including the reflection threshold may be divided into a middle grayscale section 1120, a grayscale section longer than or equal to a middle grayscale section may be defined as a high grayscale section 1130, and a grayscale section less than or equal to the middle grayscale section may be defined as a low grayscale section 1110.

In this case, the processor 150 may adjust luminance of the image signal based on a grayscale section to which main grayscale information belongs.

Figure 12A:
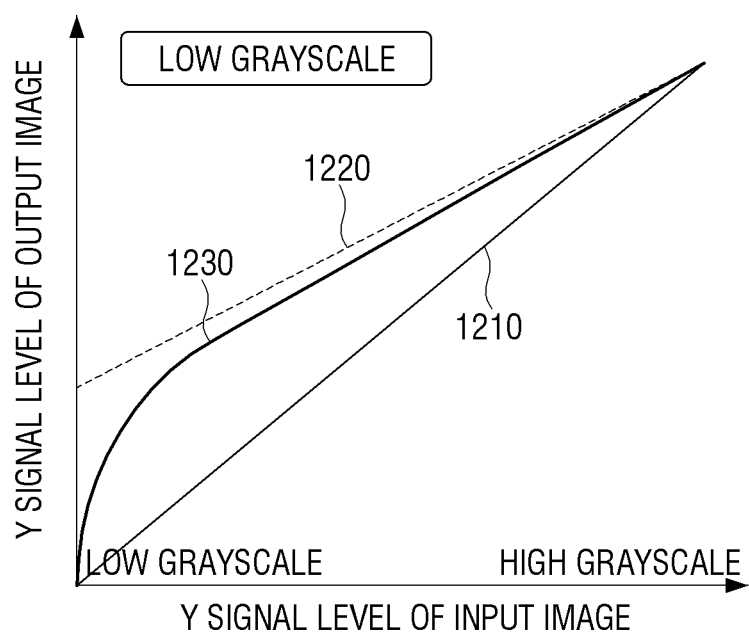
Figure 12B:
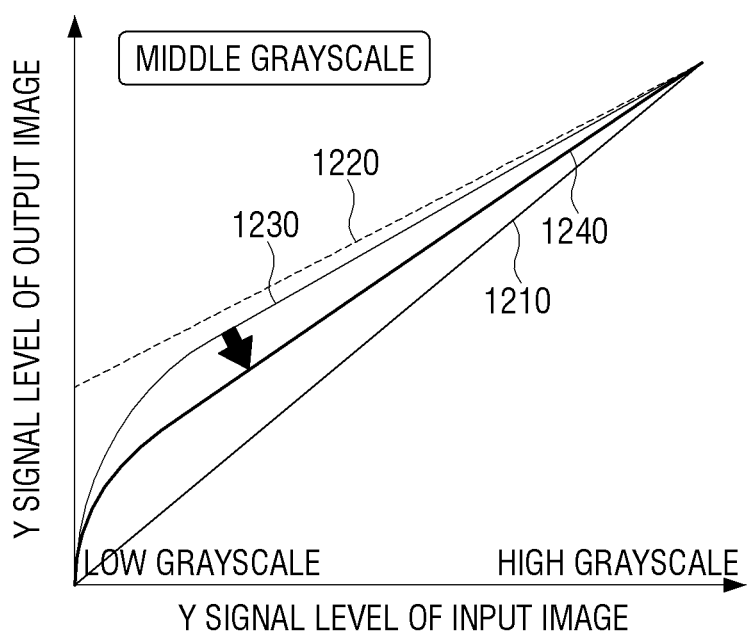
Figure 12C:
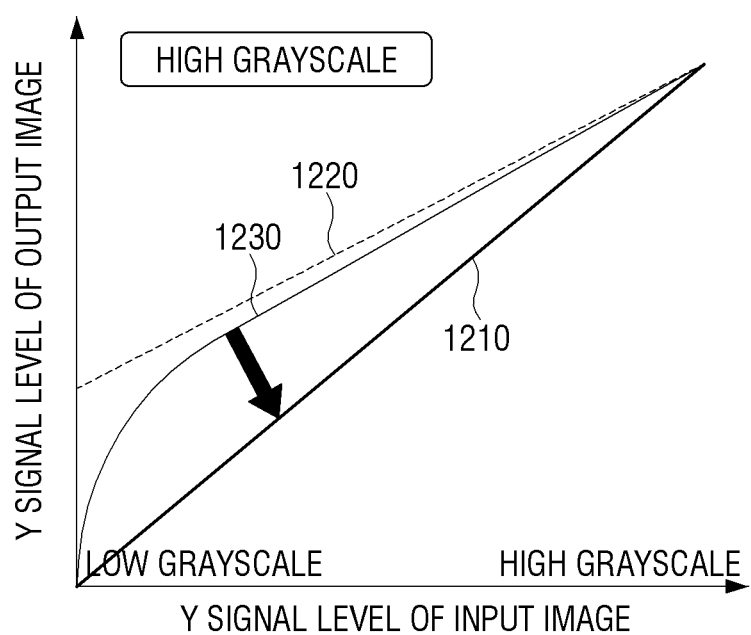

In FIGS. 12A, 12B and 12C, as illustrated in FIG. 11, a method of defining sections of the entire grayscale section as a low grayscale section, a middle grayscale section, and a high grayscale section based on the reflection threshold and performing luminance adjustment differently based on a grayscale section to which main grayscale information of the image scale belongs is described.

For example, depending on whether the main grayscale information (for example, average grayscale value) of the image signal is within the low grayscale section, the middle grayscale section and the high grayscale section, based on the luminance adjustment graph illustrated in FIGS. 12A to 12C, the luminance adjustment can be performed to minimize and/or reduce the side effect.

For example, in the case where the main grayscale information of the image signal is within a low grayscale section (hereinafter referred to as low grayscale image), as shown in FIG. 12A, the black signal may adjust luminance based on the luminance adjustment graph 1230 which approaches the auxiliary line 1220 which is calculated based on the reflection threshold of the original input signal 1210.

Also, in the case where the main grayscale information of the image signal is within the middle grayscale range (hereinafter referred to as the middle grayscale image), as illustrated in FIG. 12B, the luminance can be adjusted based on the luminance adjustment graph 1240 in which luminance level of the low luminance signal part is changed to a low ratio.

In the case where the main grayscale information of the image signal is within the high grayscale range (hereinafter referred to as high grayscale image), the side effect can be minimized by using the original input signal 1210 as it is, as illustrated in FIG. 12G. This is because, in the case of a bright image, the reflection phenomenon hardly occurs.

Figure 13A:
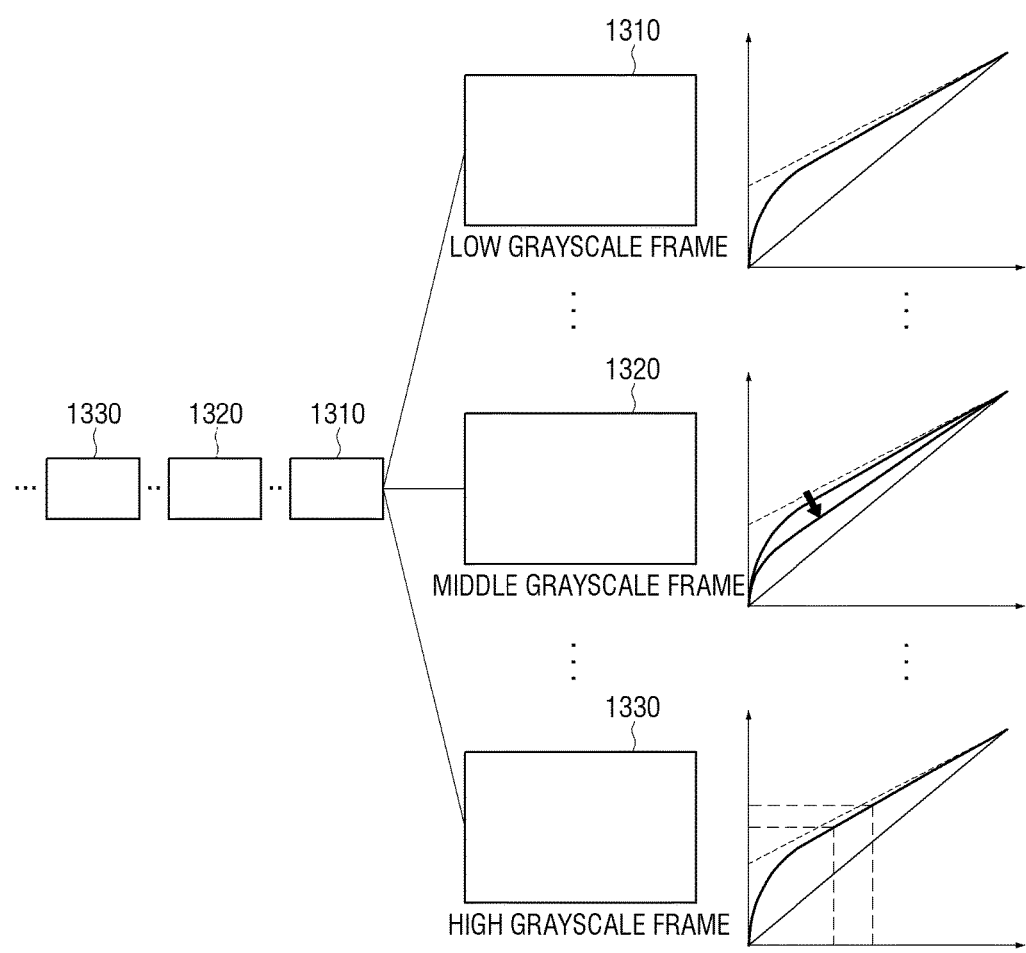

For example, as illustrated in FIG. 13A, the processor 150 may determine to which of the plurality of grayscale sections the main grayscale information belongs for each frame of the image signal, and identify each image frame as low grayscale frame 1310, middle grayscale frame 1320, and high grayscale frame 1330. Here, the main grayscale information of the image (or frame) may be average grayscale information of the image (or frame) or grayscale information having the largest pixel area, or the like.

The processor 150 may perform luminance adjustment based on a different types of graphs as illustrated in FIGS. 12A, 12B and 12C for each of the low grayscale frame 1310, the middle grayscale frame 1320 and the high grayscale frame 1330.

For example, for the low grayscale frame 1310, a luminance adjustment value corresponding to the grayscale value of each pixel of the image frame may be determined based on the luminance adjustment graph 1230 as illustrated in FIG. 12A, and the luminance adjustment for the image frame can be performed based on the luminance adjustment.

Figure 13B:
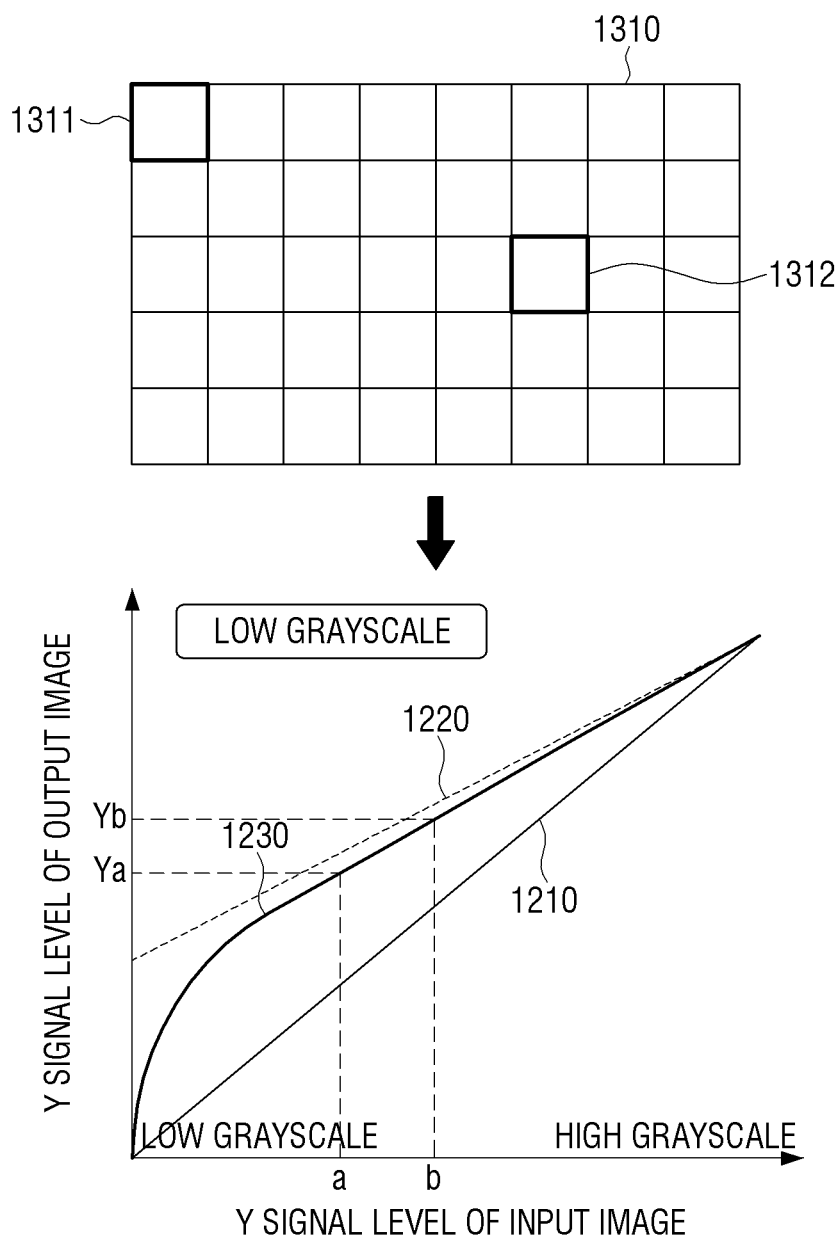

For example, when performing luminance adjustment by the luminance adjustment graph illustrated in FIG. 12A with respect to the low grayscale frame 1310, the processor 150 may calculate the luminance adjustment value for the pixel based on the grayscale values of each pixel of the low grayscale frame 1310 as illustrated in FIG. 13B. For example, the processor 150 determines grayscale values of each of pixel, and when the grayscale value of the first pixel 1311 is a, as illustrated in FIG. 13B, the processor 150 may obtain luminance adjustment value Ya corresponding to the grayscale value a as the luminance adjustment value of the first pixel 1311, and when the grayscale value of the second pixel 1312 is b, the luminance adjustment value Yb corresponding to the grayscale value a can be obtained as the luminance adjustment value of the second pixel 1311. The processor 150 may perform the corresponding process for each pixel in the scanning direction on all the pixels of the low grayscale frame 1310 as described above and obtain a luminance adjustment value for all the pixel areas of the low grayscale frame 1310.

However, the above-described example embodiment is only one embodiment, and the luminance adjustment value for all the pixel areas of the low grayscale frame 1310 may be obtained in a predetermined pixel area unit including a plurality of pixels. For example, a pixel area including four pixels may be determined as the luminance adjustment processing unit, a luminance adjustment value corresponding to the average luminance value for the four pixels may be obtained from the graph, and processing is performed in units of four pixels, and the luminance adjustment value for all the pixel areas of the low grayscale frame 1310 may be obtained.

The middle grayscale frame 1320 can be configured in the same manner as the low grayscale frame 1310 based on the luminance adjustment graph 1240 as illustrated in FIG. 12B. The luminance adjustment value corresponding to the grayscale value of each pixel is determined and the luminance adjustment for the image frame is performed based on the determined luminance adjustment value.

However, for the high grayscale frame 1330, the luminance level of the original input signal can be maintained without performing luminance adjustment.

On the other hand, in the embodiment described above, it is described that the entire grayscale section is identified as three sections including the high grayscale section, the middle grayscale section and the low grayscale section based on the reflection threshold, and each image frame is identified as high/middle/low grayscale frame corresponding to the sections and luminance adjustment is performed, but this is merely example.

For example, it is possible to perform luminance adjustment by defining the entire grayscale sections as two sections including the high grayscale section and the low grayscale section and identify each image frame as high/low grayscale frames corresponding to the grayscale sections to perform luminance adjustment based on the reflection threshold, or identify the entire grayscale sections as sub-grayscale sections which are further divided than three grayscale sections and identify each image frame to correspond to the grayscale sections to perform luminance adjustment.

According to another embodiment, the processor 150 may identify the input image as a plurality of areas based on the grayscale distribution of the image signal, and perform luminance adjustment by applying the luminance adjustment graphs different by areas based on the characteristics of each of the plurality of areas. For example, the processor 150 may analyze a grayscale histogram of an input image to divide the input image into a plurality of areas, and identify the entire grayscale section which is input based on the grayscale distribution as a plurality of grayscale sections. Then, the processor 140 may individually adjust the display luminance of the corresponding area by applying a luminance adjustment graph corresponding to at least a partial area corresponding to at least a part of the plurality of gray scale areas (for example, a low grayscale area).

For example, the processor 150 may divide the entire grayscale section of the input image into a plurality of grayscale sections based on the grayscale values (or grayscale sections) of which pixel distribution increases or decreases to a predetermined threshold value or more in a grayscale histogram of the input image. Here, the grayscale histogram is a graph showing the grayscale distribution of the pixels of the image. For example, the x-axis represents the grayscale level of the input image, and the grayscale level of the input image may be divided into 256 steps from 0 to 255 for the 8-bit image, and the y-axis may be a form representing the number of pixels. However, it goes without saying that the grayscale level of the input image can be changed according to the image.

Alternatively, the processor 150 may identify the input image as a plurality of areas according to a predetermined criteria, and may individually adjust luminance of the corresponding area by applying the luminance adjustment graph corresponding to at least a part of the plurality of areas based on the grayscale distribution of the pixels of the plurality of identified areas.

For example, the processor 150 may identify the input image frame as a plurality of pixel areas of a predetermined size, and based on the grayscale distribution of the pixels of each pixel area, identify the input frame as a plurality of areas of which display luminance can be individually adjusted. Specifically, the processor 130 may group and divide a plurality of pixel areas into a plurality of areas based on an average grayscale value of each pixel area. In this case, the processor 150 applies a different luminance adjustment graph to each of the plurality of areas according to whether the average grayscale value of the plurality of areas is within the low grayscale section, middle grayscale section, or the high grayscale section and individually adjust luminance of each area.

Alternatively, the processor 140 may divide the image into a plurality of areas according to the content attribute of the input image. For example, the object area included in each image can be divided into a plurality of areas based on metadata information about a plurality of objects included in the image. In this case, the processor 150 applies a different luminance adjustment graph to each of the plurality of areas according to whether the average grayscale value of the plurality of object areas is within the low grayscale section, the middle grayscale section, or the high grayscale section, and can adjust luminance of each area individually.

However, the method of identifying an input image into a plurality of areas is not limited to the above-described methods, and the method is not limited as long as it is a method capable of distinguishing areas based on grayscale of an image.

Further, the processor 150 can adjust the luminance of the object area to be different from that of the other areas based on the grayscale characteristics of the object area that satisfies predetermined conditions among a plurality of object areas of the input image. Here, the object area satisfying the predetermined condition may be the user's interested object area (e.g., the latest message area, the notification message display area, and the like among a plurality of message areas), but is not limited thereto. For example, in the case of an image including a background area and a human area, it is also possible to set a person as an object area of interest.

However, the area to be divided may be an object unit as described above, but is not limited thereto. For example, an area including one object and objects adjacent thereto may be a processing area for luminance adjustment.

In addition, the processor 150 may divide one object into a plurality of sub-areas based on the grayscale of a plurality of pixels of an object in each object, and apply a separate luminance adjustment graph to each sub area. For example, when the object is a mountain, a different luminance adjustment table can be applied to the middle area and the upper area of the mountain when the grayscales of the middle area and the upper area of the mountain are different.

Figure 14:
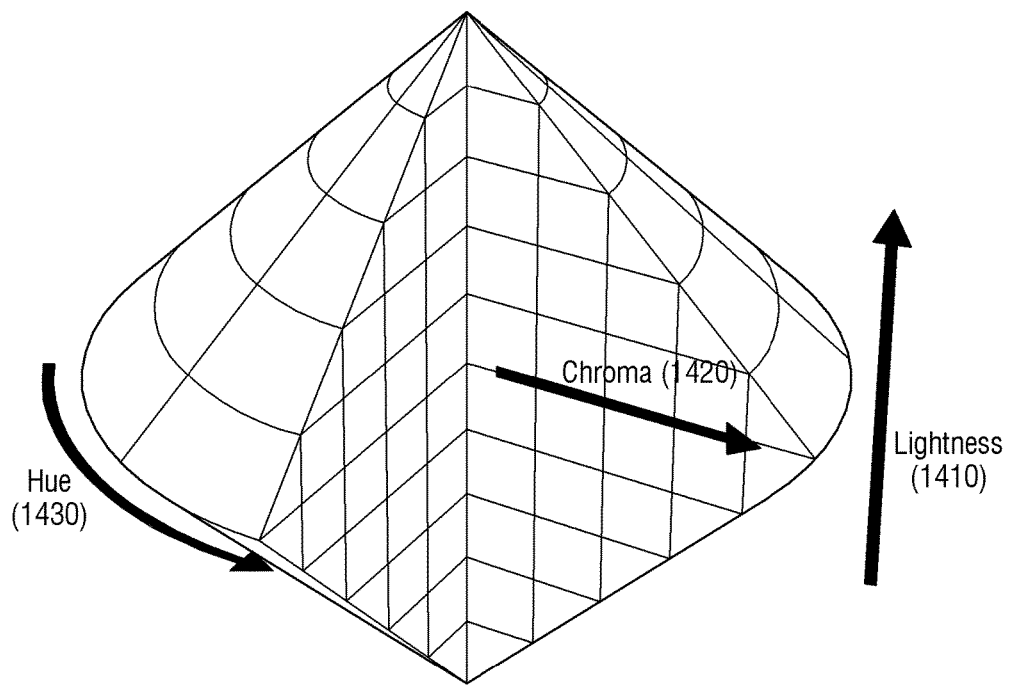
FIGS. 14, 15A, and 15B are diagrams illustrating an example method for adjusting color according to an example embodiment.
Figure 15A:
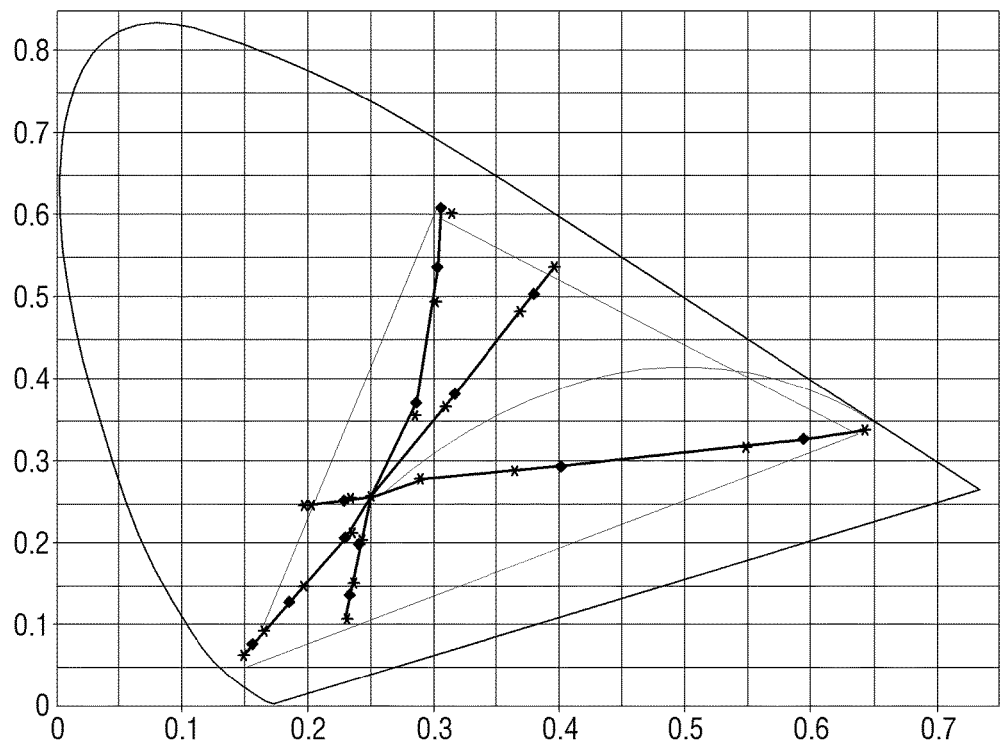
Figure 15B:
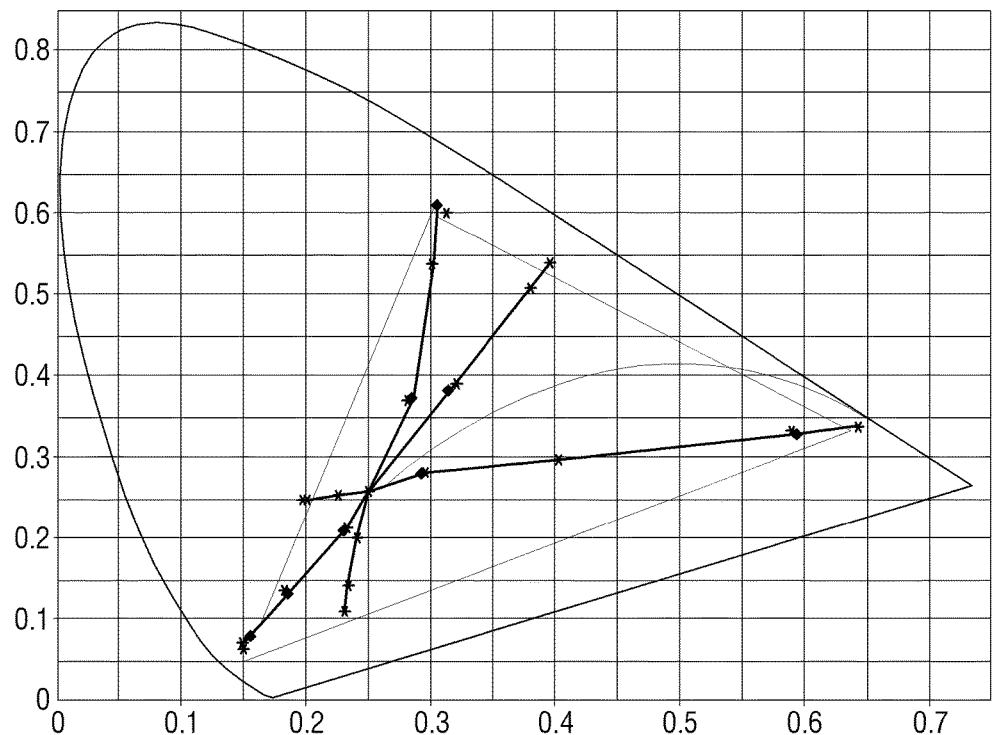

FIGS. 14, 15A, and 15B are diagrams illustrating an example method for adjusting color according to another example embodiment.

FIG. 14 is a diagram illustrating a Hue, Saturation, Lightness (HSL) color cone. In FIG. 14, the HSI (i-Hue, Saturation, Intensity), HSV (Hue, Saturation, Value (HSV) and HSB (Hue, Saturation, Luminance (HSB) models can explain the same principle. That is, I and V, B, and L represent brightness information, which means an intensity, a value, a brightness, and a lightness, respectively.

According to FIG. 14, the lightness 1410 increases as the coordinate increases upward, the saturation 1420 increases as the coordinate moves away from the center, and the Hue (color) value 1430 changes in a counterclockwise direction.

As can be seen from the color space model, the density (or the expression) of the color is slightly reduced as the brightness of the image is increased. According to another embodiment of the present disclosure, color dropout according to adjustment of luminance can be complemented.

Referring to FIG. 15A, when the luminance is adjusted according to an embodiment of the present disclosure, the original position (•) on the color space is changed to a position (*) where the color density is lowered, and such color dropout is prominent especially in the middle grayscale section.

Thus, according to another embodiment of the present disclosure, a middle grayscale color discoloration phenomenon due to the luminance adjustment can be compensated for by multiplying the middle grayscale by a constant gain. For example, it is possible to set a gain in consideration of a color value indicating a difference from a signal that is changed from an original signal, and perform image quality processing for compensating for color based thereon.

In this case, even if the luminance is adjusted as illustrated in FIG. 15B, the color dropout phenomenon can be reduced.

Figure 16A:
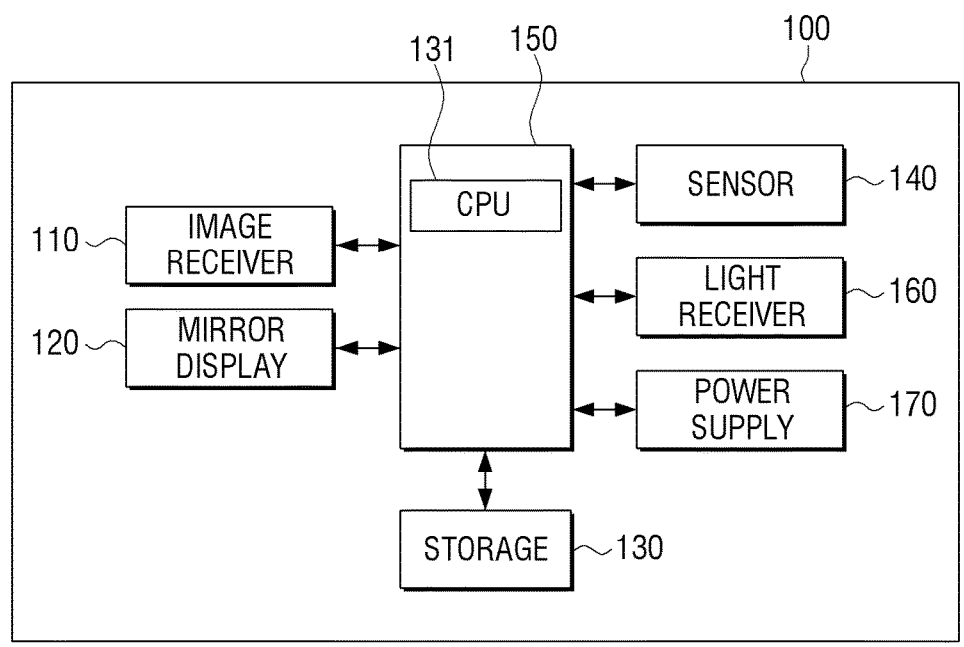
FIGS. 16A and 16B are diagrams illustrating an example configuration of the display apparatus according to an example embodiment.
Figure 16B:
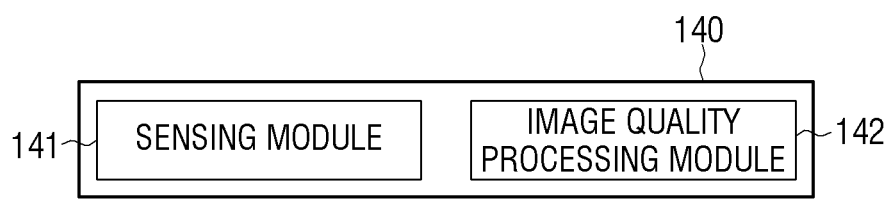

FIGS. 16A and 16B are block diagrams illustrating an example configuration of the display apparatus 100 according to an example embodiment.

According to FIG. 16A, the display apparatus 100 includes an image receiver (e.g., including image receiving circuitry) 110, a mirror display 120, a storage 130, a sensor 140, a processor (e.g., including processing circuitry) 150, a light receiver (e.g., including light receiving circuitry) 160, and a power supply 170. Detailed description of the configuration overlapping with the configuration illustrated in FIG. 2 will not be repeated here.

The image receiver (not shown) may include various image receiving circuitry and receives various image signals from an external source. Here, the image signal may include at least one of a video, an image, a text, and sound, for example. The image receiver 110 may be implemented as a wired interface including at least one of a High-Definition Multimedia Interface (HDMI) port, a component input jack, a PC input port, and a USB input jack, or may be implemented as a wireless interface including at least one of wired Ethernet, a LAN communicator and a local communicator.

The processor 150 may include various processing circuitry, including, for example, and without limitation, CPU 151, a ROM (or nonvolatile memory) storing a control program for controlling the display apparatus 100, and RAM (or volatile memory) for storing data which is input from outside the display apparatus 100 or used as a storage area corresponding to various tasks performed in the display apparatus 100.

The processor 150 may execute an Operating System (OS) and various applications stored in the storage 130 when a predetermined event occurs. The processor 150 may include a single core, dual core, triple core, quad core and multiples thereof.

The CPU 151 may access the storage 130 and perform booting using the O/S stored in the storage 130. Then, various operations are performed using various programs, contents, data, and the like stored in the storage 130.

The storage 130 may store various data, programs, or applications for driving/controlling the display apparatus 100. The storage 130 may store a control program for controlling the display apparatus 100 and the processor 150, applications, databases, or related data originally provided from a manufacturer or downloaded from the outside.

For example, the storage 130 can store a software module as illustrated in FIG. 16B.

The sensing module 141 may include an algorithm module for processing a sensing value obtained through the sensor 140, for example, an illuminance sensing value. The processor 150 may use the module to determine the current external illuminance from the sensed values obtained through the sensor 140.

Here, the image quality processing module 142 may include an algorithm module for performing image quality processing on the basis of the external illuminance obtained using the sensing module 141, the reflection ratio of the mirror display 120, the grayscale of the image, and the like. The processor 150 may perform image processing such as luminance adjustment according to an embodiment of the present disclosure or additional color adjustment according to another embodiment using the module.

The storage 130 may be implemented as an internal memory such as a ROM or a RAM included in the processor 150 or may be implemented as a separate memory from the processor 150. In this case, the storage 130 may be implemented as a memory embedded in the display apparatus 100 according to a data storage purpose, or as a memory removably attachable to the display apparatus 100. For example, data for driving the display apparatus 200 may be stored in a memory embedded in the display apparatus 100, and data for an extension function of the display apparatus 100 may be detached and attached to the display apparatus 100. The memory embedded in the display apparatus 100 may be implemented as a non-volatile memory, a volatile memory, a hard disk drive (HDD), or a solid state drive (SSD) (e.g., a micro SD card, a USB memory, etc.), or an external memory (e.g., a USB memory) connectable to a USB port, and the like.

The light receiver 160 may include various circuitry that receives an optical signal (including control information) output from a remote controller (not shown) through an optical window (not shown). The light receiver 160 can receive a light signal corresponding to a user input (e.g., touch, press, touch gesture, voice, or motion) from a remote controller (not shown). In this case, the control information extracted from the received optical signal may be transmitted to the processor 150.

The power supply 170 may include various circuitry that supplies power which is input from the external power source to the components 110 to 170 inside the display apparatus 100 under the control of the processor 150.

Figure 17:
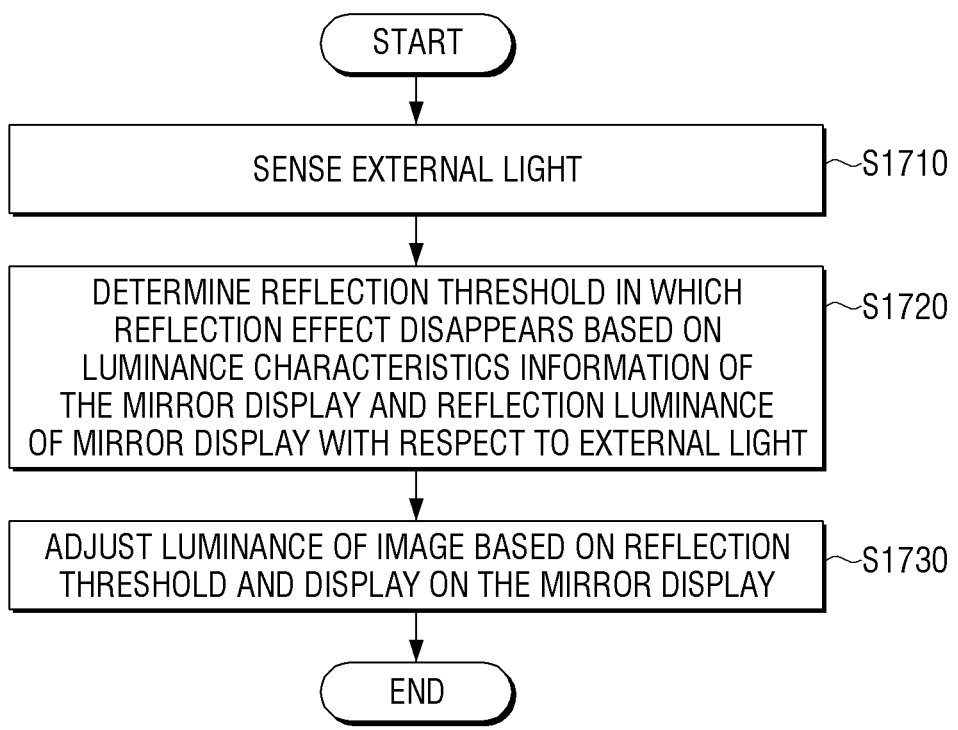
FIG. 17 is a flowchart illustrating an example method of controlling a display apparatus according to an example embodiment.

FIG. 17 is a flowchart illustrating an example method of controlling a display apparatus according to an example embodiment.

According to a controlling method of the display apparatus having the mirror display as illustrated in FIG. 17, external light is sensed (S1710).

Based on the transmission characteristics information of the mirror display, the reflection characteristics information of the mirror display, and the sensed amount of external light, the luminance of the image signal is adjusted according to whether the grayscale of the image signal is equal to or less than a predetermined threshold at which the reflection effect disappears (S1720).

Here, the transmission characteristics information of the mirror display includes luminance information in accordance with the grayscale of the image determined based on the transmission ratio of the mirror display, and the reflection characteristics information of the mirror display is information on the reflection ratio information of the mirror display and illuminance information of the mirror display with respect to the external light amount.

In S1720, based on the transmission characteristics information of the mirror display and the reflection luminance of the mirror display with respect to the external light quantity, the grayscale value having the same luminance value as the reflection luminance of the mirror display can be determined as the predetermined threshold.

In S1720, the entire grayscale range is identified as a plurality of grayscale sections based on a predetermined threshold, and the luminance of the image signal may be raised by applying different luminance adjustment schemes for each grayscale section.

Further, in S1720, input luminance level can be used for the lowest grayscale and the highest grayscale, and for the remaining grayscale sections, different luminance adjustment methods can be applied by grayscale sections and luminance of an image signal can be raised.

In S1720, the entire grayscale range may be defined or divided in sections as a low grayscale section and a high grayscale section based on a predetermined threshold. In this case, when the grayscale of the image signal is within the low grayscale section, the luminance of the image signal is adjusted upward by the first luminance level based on the reflection luminance of the image display. If the grayscale of the image signal is within the high grayscale section, the luminance of the image signal can be raised by the second luminance level.

In S1720, the entire grayscale range may be defined or divided as a low grayscale section, a middle grayscale section, and a high grayscale section with reference to a predetermined threshold. When the grayscale of the image signal is within the low grayscale section, luminance of the image signal may be raised as much as the first luminance level of the image signal based on the reflection luminance of the mirror display, when the grayscale of the image signal is within the middle grayscale section, luminance of the image signal may be maintained, and when the grayscale of the image signal is within the high grayscale section, luminance of the image can be raised as much as the second luminance level.

The control method may further include a step of defining or dividing the entire grayscale range as a plurality of grayscale sections and calculating a plurality of luminance adjustment graphs reflecting the characteristics of each of the plurality of grayscale sections based on a predetermined threshold, and adjusting the luminance of the image signal based on at least one of the luminance adjustment graph. In this case, the plurality of luminance adjustment graphs are graphs in which the input luminance level is maintained for the lowest grayscale and the highest grayscale in the entire grayscale range, and the other grayscales are adjusted in such a manner that the luminance levels are upwardly adjusted based on the characteristics of the corresponding grayscale range.

In step S1720, the luminance adjustment graph corresponding to the main grayscale information of the frame of the image signal among the plurality of luminance adjustment graphs may be identified, and the luminance level of the frame may be adjusted based on the identified luminance adjustment graph.

In step 1730, the luminance of the image to be displayed is adjusted based on the reflection threshold and the image displayed on the mirror display.

According to the various example embodiments of the present disclosure, it is possible to reduce the reflection effect of the mirror display through appropriate image processing according to the illumination environment.

Meanwhile, the methods according to various embodiments of the present disclosure described above can be implemented in the form of an application that can be installed in an existing display device.

Also, the methods according to the various embodiments of the present disclosure described above can be implemented by software upgrading or hardware upgrading or any combination thereof for existing display devices.

The above-described various embodiments of the present disclosure can also be performed through an embedded server provided in a display device or an external server.

Meanwhile, the various embodiments described above can be implemented in a non-transitory computer readable recording medium that can be read by a computer or a similar device using software, hardware, or a combination thereof. In some instances, the embodiments described herein may be implemented by the processor itself. According to the software implementation, embodiments such as the procedures and functions described herein may be implemented with separate software modules. Each of the software modules may perform one or more of the functions and operations described herein.

Meanwhile, computer instructions for performing the processing operations of the display apparatus 100 according to various example embodiments of the present disclosure described above may be stored in a non-transitory computer-readable medium. The computer instructions stored in the non-transitory computer-readable medium enables the particular apparatus to perform the processing operations in the display apparatus 100 according to the various embodiments described above when executed by the processor of the particular apparatus.

The non-transitory computer-recordable medium is an apparatus-readable medium configured to semi-permanently store data. For example, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing example embodiments, features and advantages are merely examples and are not to be construed as limiting the disclosure. The example embodiments can be readily applied to other types of device or apparatus. Also, the description of the example embodiments is intended to be illustrative, and not to limit the scope of the disclosure, and many alternatives, modifications, and variations will be apparent to those skilled in the art.

What is claimed is:

1. A display apparatus comprising:
   a mirror display;
   a sensor;
   a storage configured to store transmission characteristics information, and reflection luminance information, of the mirror display;
   a processor configured to:
   identify a threshold based on the transmission characteristics information, the reflection luminance information, and an amount of external light sensed by the sensor,
   adjust a luminance of an image signal based on whether a grayscale of the image signal is less than or equal to the threshold, and
   output an image corresponding to the image signal on the mirror display,
   wherein the processor is further configured to:
   based on a grayscale of the image signal being less than or equal to the threshold, increase the luminance of the image signal by a first luminance level based on the reflection luminance of the mirror display, and
   based on a grayscale of the image signal being greater than the threshold, increase the luminance of the image signal by a second luminance level based on the reflection luminance of the mirror display.

2. The apparatus as claimed in claim 1, wherein the transmission characteristics information of the mirror display comprises luminance information based on grayscale of an image which is determined based on transmission ratio of the mirror display, and
   wherein the reflection luminance information of the mirror display comprises at least one of: reflection ratio information of the mirror display and reflection luminance information of the mirror display with respect to the amount of external light.

3. The apparatus as claimed in claim 2, wherein the processor, based on the transmission characteristics information of the mirror display and reflection luminance of the mirror display with respect to the amount of external light, is configured to identify a grayscale value of a luminance value which is the same as the reflection luminance of the mirror display as the predetermined threshold.

4. The apparatus as claimed in claim 1, wherein the processor, based on the predetermined threshold, is configured to divide an entire scope of grayscale into a plurality of grayscale sections, and to raise the luminance of the image signal by applying different luminance adjustment methods for each grayscale section.

5. The apparatus as claimed in claim 4, wherein the processor is configured to maintain an input luminance level with respect to a lowest grayscale and a highest grayscale, and to raise the luminance of the image signal by applying different luminance adjustment methods for each grayscale sections with respect to remaining grayscale sections.

6. The apparatus as claimed in claim 4, wherein the processor is configured to identify the entire scope of grayscale into a low grayscale section, a middle grayscale section, and a high grayscale section,
  based on the grayscale of the image signal being within the low grayscale section, to increase the luminance of the image signal by the first luminance level
  based on the grayscale of the image signal being within the middle grayscale section, to maintain luminance of the image signal, and
  based on grayscale of the image signal being within the high grayscale section, to increase the luminance of the image signal as much as the second luminance level.

7. The apparatus as claimed in claim 1, wherein the processor is configured to divide, based on the predetermined threshold, the entire scope of grayscale into a plurality of grayscale sections,
  to calculate a plurality of luminance adjustment graphs to which characteristics of each of the plurality of grayscale sections are reflected,
  to adjust luminance of the image signal based on at least one of the plurality of calculated luminance adjustment graphs,
  wherein the plurality of luminance adjustment graphs are graphs in which input luminance level is maintained with respect to lowest grayscale and highest grayscale from among the plurality of grayscale sections, and luminance levels of remaining grayscale sections are raised differently based on characteristics of a corresponding sections of grayscale.

8. The apparatus as claimed in claim 7, wherein the processor is configured to identify a luminance adjustment graph corresponding to main grayscale information of frame of the image signal from among the plurality of luminance adjustment graphs and to adjust a luminance level of the corresponding frame based on the identified luminance adjustment graph.

9. The apparatus as claimed in claim 1, wherein the processor is configured to identify a color shift degree by pixel areas based on the luminance level adjustment and to adjust a color coordinate of the pixel area to compensate for the color shift.

10. The apparatus as claimed in claim 1, wherein the mirror display comprises:
  a display panel; and
  a half mirror disposed on an upper part of the display panel and having a predetermined reflection ratio and a predetermined transmission ratio.

11. A method of controlling a display apparatus including a mirror display, the method comprising:
  sensing an amount of external light; and
  identify a threshold, based on the transmission characteristics information of the mirror display, reflection luminance information of the mirror display, and the sensed amount of external light,
  adjust a luminance of an image signal based on whether a grayscale of the image signal is less than or equal to the threshold, and
  outputting an image corresponding to the image signal on the mirror display,
  the adjusting the luminance of the image signal comprises;
  based on a grayscale of the image signal being less than or equal to the threshold, increasing the luminance of the image signal by a first luminance level based on the reflection luminance of the mirror display, and
  based on a grayscale of the image signal being greater than the threshold, increasing the luminance of the image signal by a second luminance level based on the reflection luminance of the mirror display.

12. The method of claim 11, wherein the transmission characteristic information of the mirror display comprises luminance information based on a grayscale of an image which is determined based on transmission ratio of the mirror display, and
  wherein the reflection luminance information of the mirror display comprises at least one of: reflection ratio of the mirror display and luminance information of the mirror display with respect to an amount of external light.

13. The method of claim 12, wherein the outputting comprises, based on the transmission characteristics information of the mirror display and reflection luminance of the mirror display with respect to the amount of external light, identifying a grayscale value which has a same luminance value as the reflection luminance of the mirror display as the predetermined threshold.

14. The method of claim 11, wherein the outputting comprises, based on the predetermined threshold, identifying an entire scope of grayscale into a plurality of grayscale sections, and raising the luminance of the image signal by applying different luminance adjustment methods for each grayscale section.

15. The method of claim 14, wherein the outputting comprises maintaining an input luminance level with respect to a lowest grayscale and a highest grayscale, and raising the luminance of the image signal by applying different luminance adjustment methods for each grayscale sections with respect to remaining grayscale sections.

16. The method of claim 14, wherein the outputting comprises:
  based on the predetermined threshold, identifying the entire scope of grayscale into a low grayscale section, a middle grayscale section, and a high grayscale section,
  based on the grayscale of the image signal being within the low grayscale section, increasing the luminance of the image signal by the first luminance level,
  based on the grayscale of the image signal being within the middle grayscale section, maintaining luminance of the image signal, and
  based on grayscale of the image signal being within the high grayscale section, raising the luminance of the image signal by the second luminance level.

17. The method of claim 11, wherein the outputting comprises:
- based on the predetermined threshold, identifying the entire scope of grayscale into a plurality of grayscale sections and calculating a plurality of luminance adjustment graphs to which characteristics of each of the plurality of grayscale sections are reflected; and
- adjusting luminance of the image signal based on at least one of the plurality of calculated luminance adjustment graphs,
- wherein the plurality of luminance adjustment graphs are graphs in which input luminance level is maintained with respect to lowest grayscale and highest grayscale sections from among entire scope of grayscale, and luminance levels of remaining grayscale sections are raised differently based on characteristics of a corresponding scope of grayscale.

18. A non-transitory computer-readable recording medium which stores a computer command, which when executed by a processor of an electronic apparatus, causes the electronic apparatus to perform at least one operation, wherein the at least one operation comprises:
- identifying a threshold based on transmission characteristics information of a mirror display, reflection luminance information of the mirror display, and an amount of external light, and
- adjusting a luminance of an image signal based on whether a grayscale of the image signal is less than or equal to the threshold,
- the adjusting the luminance of the image signal comprises;
- based on a grayscale of the image signal being less than or equal to the threshold, increasing the luminance of the image signal by a first luminance level based on the reflection luminance of the mirror display, and
- based on a grayscale of the image signal being greater than the threshold, increasing the luminance of the image signal by a second luminance level based on the reflection luminance of the mirror display.

* * * * *